(12) United States Patent
Schmidt et al.

(10) Patent No.: US 8,349,289 B2
(45) Date of Patent: Jan. 8, 2013

(54) REACTIVE FLASH VOLATILIZATION OF FLUID FUELS

(75) Inventors: Lanny D. Schmidt, Minneapolis, MN (US); Paul J. Dauenhauer, Wisconsin Rapids, WI (US); Bradon J. Dreyer, Rockford, MI (US); James R. Salge, Lancaster, NY (US)

(73) Assignee: Regents of the University of Minnesota, St. Paul, MN (US)

( * ) Notice: Subject to any disclaimer, the term of this patent is extended or adjusted under 35 U.S.C. 154(b) by 1315 days.

(21) Appl. No.: 12/043,030

(22) Filed: Mar. 5, 2008

(65) Prior Publication Data
US 2008/0237542 A1    Oct. 2, 2008

Related U.S. Application Data

(60) Provisional application No. 60/893,072, filed on Mar. 5, 2007, provisional application No. 60/955,179, filed on Aug. 10, 2007.

(51) Int. Cl.
*C01B 3/24* (2006.01)
(52) U.S. Cl. .......... 423/650; 423/644; 423/648.1; 48/198.1; 252/373
(58) Field of Classification Search .......... 423/644, 423/648.1, 650; 48/198.1; 252/373
See application file for complete search history.

(56) References Cited

U.S. PATENT DOCUMENTS

| | | | |
|---|---|---|---|
| 3,890,432 A | 6/1975 | White | |
| 5,105,052 A | 4/1992 | Font Freide et al. | |
| 5,374,339 A * | 12/1994 | Guillet et al. | 204/157.5 |
| 5,658,497 A | 8/1997 | Kumar et al. | |
| 5,663,473 A | 9/1997 | Griffiths et al. | |
| 6,190,623 B1 | 2/2001 | Sanger et al. | |
| 6,433,234 B1 | 8/2002 | Griffiths et al. | |
| 2003/0115800 A1 | 6/2003 | Yamada et al. | |
| 2004/0199038 A1* | 10/2004 | Schmidt et al. | 585/658 |
| 2005/0176580 A1 | 8/2005 | Osaka et al. | |
| 2005/0260123 A1 | 11/2005 | Deluga et al. | |
| 2006/0032139 A1 | 2/2006 | Yamada et al. | |
| 2006/0090397 A1* | 5/2006 | Edlund et al. | 48/61 |
| 2008/0014539 A1* | 1/2008 | Pisklak et al. | 431/268 |
| 2010/0200810 A1 | 8/2010 | Schmidt et al. | |

FOREIGN PATENT DOCUMENTS

| | | |
|---|---|---|
| CA | 2083601 | 11/1991 |
| DE | 4038897 A1 | 6/1992 |
| EP | 0531371 B1 | 3/1993 |
| JP | 06-131691 | 5/1994 |
| JP | 2002-346388 | 12/2002 |
| KR | 1020020015053 | 2/2002 |

(Continued)

OTHER PUBLICATIONS

Asadullah, M., et al., "A Novel Catalytic Process for Cellulose Gasification to Synthesis Gas", *Catalysis Communications*, 2(2), (2001), 63-68.

(Continued)

*Primary Examiner* — Paul Wartalowicz
(74) *Attorney, Agent, or Firm* — Schwegman, Lundberg & Woessner, P.A.

(57) ABSTRACT

The invention provides methods for the production of synthesis gas. More particularly, various embodiments of the invention relate to systems and methods for volatilizing fluid fuel to produce synthesis gas by using a metal catalyst on a solid support matrix.

13 Claims, 28 Drawing Sheets

FOREIGN PATENT DOCUMENTS

| KR | 1020050008676 | 1/2005 |
|---|---|---|
| WO | WO-2008109129 A2 | 9/2008 |
| WO | WO-2008109129 A3 | 9/2008 |

OTHER PUBLICATIONS

Asadullah, M., et al., "Biomass Gasification to Hydrogen and Syngas at Low Temperature: Novel Catalytic System Using Fluidized-Bed Reactor", *Journal of Catalysis*, 208, (2002),255-259.

Asadullah, M., et al., "Catalytic Performance of Rh/CeO$_2$ in the Gasification of Cellulose to Synthesis Gas at Low Temperature", *Industrial & Engineering Chemistry Research*, 40, (2001),5894-5900

Asadullah, M., et al., "Novel Biomass Gasification Method With High Efficiency: Catalytic Gasification at Low Temperature", *Green Chemistry*, 4, (2002),385-389.

Boutin, O., et al., "Flash Pryolysis of Cellulose Pellets Submitted to a Concentrated Radiation: Experiments and Modelling", *Chemical Engineering Science*, 57(1), (2002), 15-25.

Bridgwater, A. V., "Renewable Fuels and Chemicals by Thermal Processing of Biomass", *Chemical Engineering Journal*, 91, (2003),87-102.

Garcia, L., et al., "Catalytic Steam Reforming of Bio-Oils for the Production of Hydrogen: Effects of Catalyst Composition", *Applied Catalysis A: General 201*, (2000), 225-239.

Salge, J. R., et al., "Renewable Hydrogen From Nonvolatile Fuels by Reactive Flash Volatilization", *Science*, 314, 2006 , 801-804.

"International Application U.S. Appl. No. PCT/US2008/002992, Search Report mailed Aug. 29, 2008".

\* cited by examiner

REACTIVE FLASH VOLATILIZATION OF FLUID FUELS

CROSS-REFERENCE TO RELATED APPLICATIONS

This application claims priority under 35 U.S.C. §119(e) to U.S. Provisional Patent Application Nos. 60/893,072, filed Mar. 5, 2007, and 60/955,179, filed Aug. 10, 2007, which are incorporated herein by reference in their entirety.

GOVERNMENT SUPPORT

This invention was made with government support under Grant Numbers DE-FG02-88ER13878 and DE-FG02-88ERB878 from the U.S. Department of Energy. The United States Government has certain rights in the invention.

FIELD OF THE INVENTION

This invention generally involves the production of synthesis gas. More particularly, various embodiments of the invention relate to systems and methods for volatilizing fluid fuel to produce synthesis gas.

BACKGROUND OF THE INVENTION

Dependence on petroleum in the United States and internationally has led to a focus on methods of using biomass as alternative energy sources. However, biomass, including fossilized biomass (e.g., petroleum), presents a significant processing challenge, because it is a complex mixture of biopolymers of low energy density. Biomass can be used to produce synthesis gas ("syngas"), which in turn can be used to produce synthetic fuels. Current methods to process biomass, such as fast pyrolysis or gasification, are complicated, slow, and typically involve transportation of the biomass to a central processing location.

Direct thermochemical conversion of biomass, without significant pre-processing, to a single clean stream of syngas would provide significant economic and environmental benefits. Syngas can easily be converted into diesel fuel through the Fischer Tropsch process or to methanol or dimethyl ether, allowing high efficiency end use in modern diesel engines without significant changes in the current transportation infrastructure. However, current processes lack effective catalytic methods that are easily scalable and sufficiently simple for coupling to standard reforming practices.

Accordingly, there is a need for improved systems and methods for producing syngas.

SUMMARY OF INVENTION

The invention provides a unique catalytic method to convert fluid biomass to synthesis gas ("syngas"), without the need for an external heat source. The method can be at least an order of magnitude faster than existing systems. Fluid biomass directly contacting a hot catalytic surface, maintained at a high temperature by heat conduction from partial oxidation of the biomass, undergoes rapid decomposition to a clean synthesis gas stream at millisecond times with minimal or no char formation. High selectivity to synthesis gas can be obtained from biomass, such as non-volatile and/or high-boiling oils, and various solutions or organic matter, permitting production of synthetic fuels from fluid biomass in a compact and simple process.

The invention further provides a method that includes contacting a fluid fuel, which includes carbon, hydrogen, and optionally oxygen, and a metal catalyst, in the presence of oxygen to produce hydrogen gas and carbon monoxide. The contacting can occur at a temperature sufficiently high to inhibit or prevent char formation. The inhibiting or preventing can relate to an amount of char formation capable of stopping production of the hydrogen gas and the carbon monoxide gas, or it can relate to an amount of char formation that only slows the synthesis gas production. In one embodiment, the metal catalyst includes a rhodium-cerium catalyst. Certain embodiments further include a system for producing syngas from a fluid biomass. The systems and methods described herein provide for shorter residence time and high selectivity for hydrogen and carbon monoxide.

The present invention is also directed to a method to convert a fluid organic fuel system into gasses, wherein the method includes contacting the fluid organic fuel system and a surface that includes a metal catalyst in the presence of oxygen gas, wherein the gasses include molecular hydrogen and carbon monoxide, and the metal catalyst includes a transition metal and optionally a lanthanide metal. The metal catalyst can be maintained at about 400° C. to about 1600° C., the fuel system can include carbon, hydrogen, and optionally oxygen, and the carbon/oxygen ratio of the fuel can be about 0.5 to about 10.0, and the contacting can optionally occur in the additional presence of a $C_1$-$C_3$ hydrocarbon gas, water, alcohol or other solvent, or a combination thereof, to provide the molecular hydrogen and the carbon monoxide. Additionally, the flow of oxygen (e.g., oxygen gas or air) to the metal catalyst surface can optionally be increased, which can further reduce or eliminate char formation.

In one embodiment, the metal catalyst may be a rhodium-cerium catalyst. In another embodiment, deactivating carbon layers are not formed. In yet another embodiment, when a deactivating carbon layer forms, the method can further include volatilizing the deactivating carbon layer by contacting the fuel system and the catalyst surface with the $C_1$-$C_3$ hydrocarbon gas, water, alcohol or other solvent, or a combination thereof, and optionally increasing the temperature of the catalyst.

In one embodiment, the fuel is impinged onto the metal catalyst by spraying, and reactive flash volatilization is carried out for about 0.1 millisecond to about 100 milliseconds. In another embodiment, the reactive flash volatilization is carried out for about 0.5 millisecond to about 50 milliseconds, or about 0.5 millisecond to about 10 milliseconds.

In yet another embodiment, the fuel is contacted with the catalyst surface at a rate sufficient to maintain the back surface temperature of the catalyst at about 400° C. to about 1400° C. In one embodiment, the fuel is contacted with a transition metal catalyst surface at a rate sufficient to maintain the back surface temperature of the catalyst at about 750° C. to about 1200° C. In another embodiment, the fuel is contacted with a transition metal catalyst surface at a rate sufficient to maintain the back surface temperature of the catalyst at about 800° C. to about 1100° C.

In one embodiment, the carbon/oxygen ratio of the fuel is about 0.5 to about 1.5. In another embodiment, the carbon/oxygen ratio of the fuel is about 0.7 to about 1.2. In yet another embodiment, the carbon/oxygen ratio of the fuel is about 0.9 to about 1.1. In some embodiments, the fuel is volatilized before contacting the surface. In some embodiments, the fuel is thermally cracked before contacting the surface. In yet other embodiment, the fuel contacts the surface as a liquid droplet.

The invention is also directed to a method that includes contacting a carbon and hydrogen-containing fluid fuel and a metal catalyst in the presence of oxygen to produce hydrogen gas and carbon monoxide, wherein the contacting occurs at a temperature sufficiently high to prevent char formation in an amount capable of stopping production of the hydrogen gas and the carbon monoxide gas.

The metal catalyst can include a transition metal or a noble metal. The metal catalyst can contain a transition metal or noble metal optionally in combination with a lanthanide. The transition metal or noble metal can include Ni, Pd, Pt, Co, Rh, Ir, Fe, Ru, Os, Cu, Ag, Au, Re, or a combination thereof. The lanthanide can be cerium or lanthanum, or a combination thereof. The metal catalyst can be a rhodium-cerium catalyst.

The carbon and hydrogen-containing fluid fuel can be non-fossilized biomass. The biomass can be plant biomass, municipal waste biomass, or animal biomass. The plant biomass can include an oil of plant origin. The oil of plant origin can be soybean oil.

The plant biomass can include glycerol. The animal biomass can include an oil of animal origin. The municipal waste biomass can include matter of petroleum origin. The animal and/or plant biomass can include alcohols, esters, aldehydes, ketones, acids, lignates, or combinations thereof.

The fuel further can include water. The contacting can occur in the presence of added oxygen, an inert gas, or combination thereof. A $C_1$-$C_3$ hydrocarbon gas can also be present when contacting begins and wherein the $C_1$-$C_3$ hydrocarbon gas preheats the catalyst. Alcohol or a solvent can be present when contacting begins, which preheats the catalyst.

In one embodiment, carbon and oxygen are present in a ratio of between about 0.3 and 2.5. In another embodiment, the temperature is at least about 400° C., preferably about 600° C. more preferably about 800° C. In yet another embodiment, the catalyst has a surface temperature and the fuel is contacted with a surface of the metal-based catalyst at a rate sufficient to maintain the back face temperature of the catalyst between about 500° C. and about 1600° C. In various embodiments, the temperatures and ranges cited herein can refer to the back face, or front face, temperature of the catalyst surface, support, network, or foam.

In one embodiment, the individual selectivity to hydrogen and carbon monoxide is between about 0% and 99%, for example, about 0.5% to about 98%, or about 5% % to about 95%. In one embodiment, the contacting occurs in a reactor. In another embodiment, the total residence time of the hydrogen gas and the carbon monoxide gas is less than about 500 milliseconds.

In one embodiment, the total residence time of the hydrogen gas and the carbon monoxide gas is less than about 80 milliseconds. In another embodiment, the fuel is volatilized before contacting the surface. In another embodiment, the fuel is not volatilized before contacting the surface. In another, the fuel is cracked thermally before contacting the catalyst. In another embodiment, the fuel reacts with the co-fed gases, and/or other feeds before contacting the surface.

The invention is also directed to a method for producing synthesis gas in a reactor including: inputting a carbohydrate-based or a plant oil-based fluid fuel into the reactor at about room temperature, wherein the reactor contains a transition metal-lanthanide catalyst, inputting nitrogen and oxygen into the fluid fuel source and the reactor at about room temperature, wherein carbon and oxygen are input in a ratio of between about 0.3 to about 2.5, and allowing the particles to contact a front surface of the catalyst wherein synthesis gas is produced at a total gas residence time of less than about 500 milliseconds without an external heating system. The fuel can be, but is not limited to, glycerol and/or biodiesel.

In one embodiment, the method further includes inputting a $C_1$-$C_3$ hydrocarbon as a start-up gas. In another embodiment, the $C_1$-$C_3$ hydrocarbon is input for less than about five minutes to heat the catalyst prior to inputting the particles. In yet another embodiment, the carbohydrate-based fluid fuel includes a composition including starch, cellulose, hemicellulose, lignin, monosaccharides, disaccharides, or a combination thereof. This composition may be an aqueous (e.g., water), alcoholic (e.g., methanol, ethanol, propanol, etc.), or an organic solvent (e.g., dimethyl sulfoxide, dimethyl formamide, toluene, acetone, methyl ethyl ketone, hexanes, petroleum ether, etc.) based solution. The composition may also be a dispersion or suspension of solids in an aqueous (e.g., water), alcoholic (e.g., methanol, ethanol, propanol, etc.), or an organic solvent (e.g., dimethyl sulfoxide, dimethyl formamide, toluene, acetone, methyl ethyl ketone, hexanes, esters, ethers, organic acids, petroleum ether, etc.) based solution.

The carbohydrate-based fluid fuel can be glycerol. The plant oil-based fluid fuel can be soybean oil. The carbon and oxygen in the fuel source can be input in a ratio of between about 0.2 to about 1.8, or between about 0.3 to about 1.5, or between about 0.8 to about 1.2. The fuel can be volatilized before contacting the surface. In another embodiment the fuel is cracked or otherwise reacted before contacting the surface.

The present invention is also directed to a system for producing synthesis gas including: a reactor containing a transition metal-based catalyst on a support, means for heating the metal-based catalyst, and means for inputting fluid biomass, nitrogen, and oxygen into the reactor at a carbon to oxygen ratio of between about 0.3 and about 3 wherein the fluid biomass contacts a surface of the catalyst to produce synthesis gas.

The means for inputting the fluid biomass can be a spray fuel injector. The means for heating the metal-based catalyst can include a means for inputting a $C_1$-$C_3$ hydrocarbon gas. The support can be a ceramic (such as alumina) foam or spheres. The means for inputting the fluid biomass can be a nozzle, a nebulizer, or a functionally equivalent device.

In one embodiment, the fluid biomass is volatilized before contacting the surface. In another embodiment, the fluid biomass is cracked or otherwise reacted before contacting the surface.

The present invention is also directed to a method to convert a fluid organic fuel system into gasses including contacting the fluid organic fuel system and a surface that includes a metal catalyst in the presence of oxygen gas, wherein the gasses comprise molecular hydrogen and carbon monoxide and the metal catalyst includes a transition metal and a lanthanide metal, the metal catalyst is maintained at about 400° C. to about 1600° C., the fuel system includes glycerol, and the contacting occurs optionally in the additional presence of a $C_1$-$C_3$ hydrocarbon gas, water, alcohol, solvent, or a combination thereof, to provide the molecular hydrogen and the carbon monoxide.

In one embodiment, the metal catalyst is a rhodium-cerium catalyst. In another embodiment, deactivating carbon layers are not formed. In yet another embodiment, where a deactivating carbon layer forms, further processing including volatilizing the deactivating carbon layer by contacting the fuel system and the catalyst surface with the $C_1$-$C_3$ hydrocarbon gas, water, alcohol, solvent, pure hydrocarbon feedstock, oxygen gas, or a combination thereof, and optionally increasing the temperature of the catalyst.

In one embodiment, the fuel is impinged onto the metal catalyst by spraying, and reactive flash volatilization is carried out for about 0.1 millisecond to about 100 milliseconds.

In another embodiment, the reactive flash volatilization is carried out for about 0.5 millisecond to about 10 milliseconds, or about 50 milliseconds. In yet another embodiment, the fuel is contacted with the catalyst surface at a rate sufficient to maintain the back surface temperature of the catalyst at about 400° C. to about 1200° C. In one embodiment, the fuel is contacted with the catalyst surface at a rate sufficient to maintain the back surface temperature of the catalyst at about 750° C. to about 1200° C.

The fuel can be contacted with the rhodium-cerium catalyst surface at a rate sufficient to maintain the front surface temperature of the catalyst at about 800° C. to about 1100° C. The glycerol can be volatilized before contacting the surface. In another embodiment, glycerol is not volatilized before contacting the surface.

The present invention is also directed to a method including: contacting glycerol and a metal catalyst in the presence of oxygen to produce hydrogen gas and carbon monoxide, wherein the contacting occurs at a temperature sufficiently high to prevent char formation in an amount capable of stopping production of the hydrogen gas and the carbon monoxide gas. In yet another embodiment, the contacting occurs in the presence of added oxygen, steam, carbon dioxide, an inert gas, or a combination thereof.

A $C_1$-$C_3$ hydrocarbon gas can be present when contacting begins and the $C_1$-$C_3$ hydrocarbon gas can preheat the catalyst. The temperature can be at least about 400° C., preferably about 600° C., more preferably about 800° C. The fuel can be contacted with a surface of the metal-based catalyst at a rate sufficient to maintain the back surface temperature of the catalyst between about 500° C. and about 1600° C.

In one embodiment, the total residence time of the hydrogen gas and the carbon monoxide gas is less than about 80 milliseconds. In one embodiment, glycerol is volatilized before contacting the metal catalyst.

The present invention is also directed to a method for producing synthesis gas in a reactor including: inputting a glycerol-based fluid fuel into the reactor at about room temperature, wherein the reactor contains a transition metal-lanthanide catalyst, inputting nitrogen and oxygen into the fluid fuel source and the reactor at about room temperature, wherein carbon in the fuel and oxygen in the oxidizer are input in a ratio of between about 0.3 to about 2.5, and allowing the particles to contact a front surface of the catalyst wherein synthesis gas is produced at a total gas residence time of less than about 500 milliseconds without an external heating system.

The invention is also directed to a system for producing synthesis gas including: a reactor containing a transition metal-based catalyst on a support, means for heating the metal-based catalyst, and means for inputting glycerol, oxygen, and optionally nitrogen or other gaseous matter into the reactor at a carbon to oxygen ratio of between about 0.3 and about 3, wherein the glycerol contacts a surface of the transition metal-based catalyst to produce synthesis gas.

BRIEF DESCRIPTION OF THE DRAWINGS

Embodiments of the invention may be best understood by referring to the following description and accompanying drawings. The description and accompanying drawings may highlight a certain specific example, or a certain aspect of the invention, however, one skilled in the art will understand that portions of the highlighted example or aspect may be used in combination with other examples or aspects of the invention.

DEFINITIONS

Figure 1:
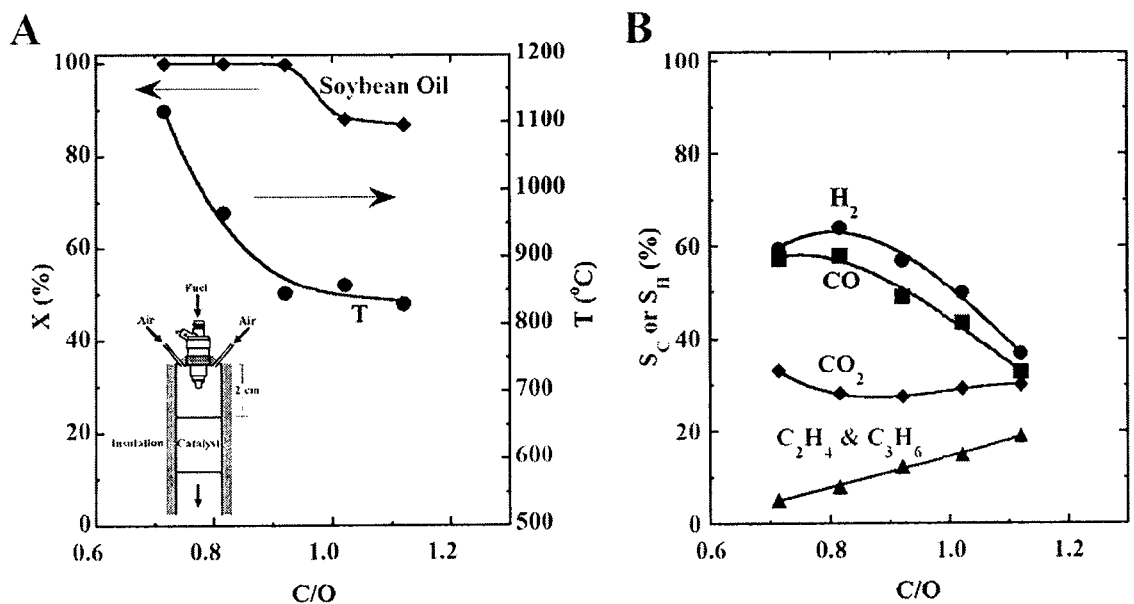
FIG. 1 illustrates the results of reactive flash volatilization of soy oil: (A) conversion, denoted in the figure as "X (%)", and temperature, and (B) selectivities to $H_2$ and carbon products. $S_c$ and $S_H$ are defined as (C or H atoms in product)/(C or H atoms in converted fuel), according to one embodiment. All gases and liquids enter the reactor at room temperature, and no process heat is added. The inset shows a reactor configuration according to one embodiment, in which liquid drops of soy oil from an automotive fuel injector strike a Rh—Ce catalyst on an alumina foam to convert the drops in approximately 20 ms without carbon formation.

As used herein, certain terms have the following meanings. All other terms and phrases used in this specification have their ordinary meanings as one of skill would understand. Such ordinary meanings may be obtained by reference to technical dictionaries, such as *Hawley's Condensed Chemical Dictionary* 11$^{th}$ Edition, by Sax and Lewis, Van Nostrand Reinhold, New York, N.Y., 1987, and *The Merck Index*, 11$^{th}$ Edition, Merck & Co., Rahway N.J. 1989.

As used herein, the term "and/or" means any one of the items, any combination of the items, or all of the items with which this term is associated.

As used herein, the singular forms "a," "an," and "the" include plural reference unless the context clearly dictates otherwise. Thus, for example, a reference to "a formulation" includes a plurality of such formulations, so that a formulation of compound X includes formulations of compound X.

As used herein, the term "about" means a variation of 10 percent of the value specified, for example, about 50 percent carries a variation from 45 to 55 percent. For integer ranges, the term about can include one or two integers greater than and less than a recited integer.

As used herein, the term "animal biomass" refers to any material generated by animals. Animal biomass includes, for example, animal tissue and animal excrement.

As used herein, the term "ash" refers to inorganic minerals remaining after thermal conversion of a fuel. The inorganic material can, for example, include calcium, magnesium, potassium, and various compounds and salts thereof, such as those that include carbonate, halide, or hydroxide cations.

As used herein, the term "biomass" refers to any plant or animal matter used directly as fuel or converted into fuels or electricity and/or heat.

The term "$C_1$-$C_3$ hydrocarbon" refers to an unbranched or branched organic compound. Typical examples include methane, ethane, propane, and combinations thereof.

As used herein, the term "carbohydrate-based fluid fuel" refers to any carbohydrate material in fluid form. In one embodiment, the carbohydrate in fluid form can be a carbohydrate solution, for example, a glucose solution (see for example, Dauenhauer, Salge, and Schmidt, *J. Catalysis* 244 (2006), 238-247; incorporated herein by reference).

As used herein, the term "carbon and hydrogen-containing fluid fuel" refers to any carbon and hydrogen-containing material in fluid form.

The term "char" refers to a material rich in carbon, hydrogen, and oxygen, which results from the thermal conversion of a fuel. Char may further contain ash if the solid fuel contained ash. Those skilled in the art often use the terms "carbon", "carbon formation", and "coke" interchangeably with the term "char" and such an interpretation is intended herein.

As used herein, the term "C/O ratio" refers to the molar ratio of carbon atoms to oxygen atoms in a fuel source and oxidant stream. In this ratio, "Carbon" is defined as carbon atoms in the fuel and "Oxygen" is defined as oxygen atoms in the oxidant stream (typically $O_2$ or Air). A carbon/oxygen ratio of the fuel refers to the ratio of elemental carbon and oxygen within the molecules of the unreacted fuel system, whereas in the context of the oxygen gas present at the metal catalyst surface, the carbon/oxygen ratio refers to the ratio wherein the carbon is counted from within the unreacted fuel and the oxygen is counted from the oxidizing source, such as molecular oxygen ($O_2$ gas) or air.

As used herein, the term "deactivating carbon layer" refers to a layer of carbon or char deposited on the catalyst such that the activity of the catalyst is reduced or eliminated.

As used herein, the term "fluid" refers to a liquid, gas, or a plasma. The fluid may be used as a transport medium for other materials, such as the particles of a slurry, suspension, or other mixture.

As used herein, the term "fluid fuel" refers to a composition that contains materials made of carbon and hydrogen, optionally oxygen, and further optionally other elements that can be present in biomass and other wastes, wherein the composition is not a solid or non-flowing suspension. The fluid fuel can be a liquid, a gas, or in certain embodiments, a combination thereof. The fluid fuel can be a pure substance, or a combination of substances. When the fluid fuel is a combination of substances, it can be referred to as a "fluid organic fuel system." Typical fluid fuels include oils, including animal based, vegetable based, and petroleum based oils. Other fluid fuels include solutions, suspensions, or mixtures, including aqueous and/or alcoholic solvents. These fluid fuels may also include alcohols (e.g., $C_2$-$C_{18}$ alkanols), glycols (including poly-glycols such as ethylene glycol), glycerol, soybean oil, organic acids (e.g., $C_2$-$C_{18}$ organic acids), esters (e.g., $C_2$-$C_{18}$ alkyl esters), ethers (e.g., $C_2$-$C_{18}$ alkyl ethers), and the like. A "liquid fuel" can be a fluid fuel that is a liquid at about 23° C. In some embodiments, the fluid fuel comprises six or more carbon atoms per molecule, or greater than about 6 carbon atoms per molecule, for example, when using linear or branched unsubstituted alkanes or alkanols. A fluid fuel system can be any composition that includes the recited fuels, and optionally other components. In some embodiments, the fluid fuel does not include $C_1$-$C_5$, or $C_1$-$C_6$, alkanes, or $C_1$-$C_5$, or $C_1$-$C_6$, alkanols.

As used herein, the term "inert gas" refers to nitrogen gas and the noble gases (i.e., the elements in group 18 (Group 0 IUPAC style) of the periodic table). Particularly suitable noble gasses include helium and argon.

As used herein, the term "metal catalyst" refers to a catalyst that contains one metal, metal-containing compound, or metal-containing composite. In various embodiments, the metal catalyst can optionally include a second metal, metal-containing compound, or metal-containing composite. The term "mixed-metal catalyst" refers to a catalyst that contains more than one metal, metal-containing compound, or metal-containing composite. The metal catalyst may be supported on another material such as a ceramic-like alumina, zirconia, or ceria support, or a metal support. The presence of a catalyst support is found with the catalyst in any embodiment that requires a catalyst support, as would be readily recognized by those skilled in the art.

The term "municipal waste biomass" refers to wastes produced by the residential, commercial, industrial, and public service sectors that are collected and used directly as fuel or converted into fuels, electricity, and heat. Municipal waste biomass may include, for example, petroleum products such as motor oil, tires, plastic materials, and spent solvents.

As used herein, the term "plant biomass" refers to any plant matter used directly as fuel or converted into fuels, electricity, and/or heat.

As used herein, the term "plant oil-based fluid fuel" refers to any plant oil used directly as fuel or converted into fuels, electricity, and/or heat.

As used herein, the term "reactant gas" refers to any gas or gasses, or fluid fuel that has been volatilized, that can be used that can be used as a component in the production of synthesis gas.

As used herein, the term "reactive flash volatilization" refers to volatilizing and/or decomposing a carbon-containing fuel by contacting (e.g., by impact) the fuel to a hot catalyst surface, or by bringing the fuel into close enough proximity to a hot catalyst surface such that the fuel is volatilized and/or decomposed. Reactive flash volatilization should be interpreted to also include the cracking or other reactions that occur as a result of introducing fuel to a hot surface that is not selected for its catalytic properties, such as a ceramic insulator included upstream of the catalyst. In this instance, the non-catalytic material precedes a catalytic material in the reactor.

As used herein, the term "residence time" refers to the volume of the catalyst bed divided by the volumetric flow rate.

As used herein, the term "solvent" refers to an aqueous or organic liquid that is capable of dissolving another substance. One type of solvent is water. Another type of solvent is alcohol ("ethanol"). Other oxygenated hydrocarbons (e.g., hydrocarbons that have hydroxyl substituents, oxo substituents, ester moieties, and the like) can be solvents, such as methanol, propanol, acetone, ethyl acetate, and the like. A solvent can be used as a co-feed for biomass or other fluid fuel sources. In certain embodiments, water and/or alcohol ("ethanol") are referred to specifically for clarity.

As used herein, the term "synthesis gas" or "syngas" refers to a mixture of hydrogen and carbon monoxide. Syngas is an intermediate for the production of synthetic fuels (e.g., natural gas, diesel, synthetic gasoline, dimethyl ether, and the like), chemicals (e.g., alkanes, methanol, mixed alcohols, ethers, and the like) and fertilizers (e.g., ammonia). Syngas is also useful as a source of energy in gas engines, gas turbines, fuel cells, and the like. Syngas may also include, for example, other materials such as water, carbon dioxide, and methane.

DETAILED DESCRIPTION

The present invention provides a system and method of fluid biomass conversion to syngas. Droplets of nonvolatile fuels such as soy oil and glucose-water solutions can be flash evaporated by catalytic partial oxidation to produce hydrogen in high yields with a total time in the reactor of less than 50 milliseconds. Pyrolysis, coupled with catalytic oxidation of the fuels and their fragments upon impact with a hot rhodium-cerium catalyst surface, can be used to avoid the formation of deactivating carbon layers on the catalyst. The catalytic reactions of these products generate approximately 1 megawatt of heat per square meter, which maintains the catalyst surface above 800° C. at high drop impact rates. At these temperatures, heavy fuels can be catalytically transformed directly into hydrogen, carbon monoxide, and other small molecules in very short contact times without the formation of carbon.

The direct conversion of nonvolatile hydrocarbons and other fluid organic matter into syngas (a mixture of molecular hydrogen and carbon monoxide ("$H_2$" and "CO")) and other small molecules is an important process for using renewable fuels such as vegetable oils and liquids produced by hydrolysis or pyrolysis of biomass. For example, hydrogen is needed for fuel cells and for onboard combustion in vehicles for enhanced performance and reduced emissions. Additionally, syngas is used for the production of synthetic liquid fuels, chemicals, and fertilizers.

The conversion of gaseous and volatile fuels to $H_2$ is possible through pyrolysis, steam reforming, and partial oxidation, with or without catalysts. However, the direct processing of nonvolatile fuels such as vegetable oils, residual petroleum fuels, and liquid biomass is more complicated because of their tendency to form solid carbon that interferes with process equipment and rapidly plugs pores in heterogeneous catalysts. Such "heavy" fuels may often decompose chemically, before evaporating, to form hydrogen, olefins, aromatics, and solid carbon.

Flash pyrolysis of heavy liquids and solid biomass has been shown to produce primarily gases (syngas) and volatile liquids (bio-oils). Flash pyrolysis reaction times are typically about 1 second. Reaction times in these processes are limited by heat transfer into biomass particles to decompose reactants. Additionally, at least approximately 10% of the reactant biomass is reported to form a solid char that is separated and removed. Nonvolatile solid biomass pellets have been shown to volatilize without the formation of carbon when exposed to very high heat fluxes (approximately $10^6$ W/m$^2$) of focused radiation from a xenon lamp (O. Boutin, M. Ferrer, J. Lede, *Chem. Eng. Sci.* 57, 15 (2002)). It has been discovered that similar high heat fluxes can also occur by catalytic partial oxidation of fluid biomass to $H_2$ and CO, providing a comparable steady-state environment where nonvolatile biomass can be decomposed without the production of carbon.

Reactive Flash Volatilization

The present invention provides a system and method for steady-state reactive flash volatilization using a fluid biomass, with no external heat supplied, by flash heating small drops of heavy fuels in the presence of small amounts of $O_2$ impinging on a catalyst-coated ceramic foam maintained at about 750° C. to about 1250° C. by the reaction. For example, by flash heating small drops of heavy fuels in the presence of small amounts of $O_2$ impinging on a catalyst-coated ceramic foam maintained at approximately 800° C. by the reaction, it is possible to achieve steady-state operation with refined soy oil, biodiesel (the volatile methyl ester of soy oil), and/or sugar-water solutions, with no external heat supplied. This process produces approximately 70% selectivity to $H_2$ with >99% conversion of the fuel. Carbon formation does not occur because the presence of $O_2$ produces rapid oxidation of decomposition products, and the resulting heat of reaction maintains a surface temperature of 800° to 1000° C. that prevents quenching of the process that would lead to rapid carbon formation.

The reactor, schematically illustrated in FIG. 1, is similar to those described previously (J. J. Krummenacher, K. N. West, L. D. Schmidt, *J. Catal.* 215, 332 (2003)). The reactor can use a fuel injector, such as an automotive fuel injector, or a nozzle, nebulizer, or other mechanism for delivering fine droplets or aerosols. The fuel injector can spray drops onto a catalyst. The drops can be about 10 μm to about 800 μm in diameter, or about 100 μm to about 600 μm in diameter, for example, about approximately 400-μm in diameter. The catalyst foam contains a catalyst, for example, Rh—Ce particles. The catalyst particles are typically ceramic supports coated with each component, such as rhodium and cerium, at about 2.5% to about 5% by weight of the bare support. The catalyst can be placed a short distance, for example, about 2 cm, from the fuel injector so that the cold drops impinged directly on the back face of the catalyst. Air can flow around the fuel injector to provide a uniform flow field, which can be used to optimize mixing with the gaseous products. Air and fuel can enter at room temperature, or about 20° C. In one embodiment, no external heating is needed.

It is typically advantageous to have the liquid impinge on a very hot surface so as to prevent carbon formation. Accordingly, the process can be initiated by flowing air mixed with $CH_4$ over the catalyst for light-off to heat the front face of the catalyst to about 1000° C. The fuel injector flow can then be started, and the $CH_4$ can be reduced or shut off to maintain a constant C/O ratio (the ratio of C atoms in the fuel to the O atoms in air) of approximately 1.0, which is one of the optimum stoichiometric ratio for the formation of syngas.

The processes described herein produce no more than a few percent of higher hydrocarbons (primarily ethylene and propylene) for any of these fuels at C/O=0.8. Accordingly, these products are suitable for use in a fuel cell with minimal cleanup. Up to 20% carbon atom selectivity to ethylene and propylene at C/O=1.2 was observed, and operation at higher C/O ratios should produce much higher yields of olefins, comparable to the 80% total olefins reported for conventional catalytic partial oxidation of biodiesel (R. Subramanian, L. D. Schmidt, *Angew. Chem. Int. Ed.* 44, 302 (2005)) and hexadecane (J. J. Krummenacher, K. N. West, L. D. Schmidt, *J. Catal.* 215, 332 (2003)). Operation at higher C/O ratios could involve the adjustment of preheat and flow conditions and perhaps the use of sacrificial $CH_4$ to avoid carbon formation. These techniques, including those described in U.S. Pat. No. 5,663,473, where heavy petroleum was co-fed with light hydrocarbons to produce ethylene and higher olefins, can be employed in certain embodiments of the present invention.

Any suitable type of fluid or fluidized biomass (i.e., biofuel) containing carbon and hydrogen may be used in the present invention. In one embodiment, the biomass is non-fossilized biomass such as plant biomass, municipal waste biomass or animal biomass. The plant biomass includes, but is not limited to, vegetable oils and the like.

The catalyst can be preheated by any suitable means. In one embodiment, a $C_1$-$C_3$ hydrocarbon gas is added to the reactor system to preheat the catalyst. In one embodiment, the catalyst has a surface temperature and the fuel is contacted with a surface of the metal-based catalyst at a rate sufficient to maintain the front surface temperature of the catalyst between about 500° C. and about 1600° C. In one embodiment, the temperature is at least about 400° C.

Any suitable reactant gases can be used. In one embodiment the reactant gases include oxygen. In another embodiment, the reactant gases include oxygen and nitrogen. In some embodiments, the reactant gases include oxygen and water. In other embodiments, the reactant gases include oxygen, $C_1$-$C_3$ hydrocarbons and/or nitrogen. In another embodiment, the reactant gasses include hydrogen, oxygen, nitrogen, water, and/or $C_1$-$C_3$ hydrocarbons. In one embodiment, the carbon in the fuel and the oxygen in the molecular oxygen are present in a ratio of between about 0.3 and 2.5.

The methods described herein have high selectivities to hydrogen and carbon monoxide. In one embodiment the selectivity may be as high as 99%. Any suitable reactor may be used for the rapid volatilization method described herein. In one embodiment, total residence time of the hydrogen gas and the carbon monoxide gas is less than about 500 milliseconds. In one embodiment, total residence time of the hydrogen gas and the carbon monoxide gas is less than about 80 milliseconds. In other embodiments, reactive flash volatilization can be carried out on organic fluids in less than about 50 milliseconds, or in less than about 25 milliseconds, with no solid carbon formation on the catalyst surface. This catalytic reformation process can be more than 10 to 1000 times faster than conventional reformation processes.

Therefore, liquid organic fuels, volatile or non-volatile, can be reformed over metal catalysts autothermally, on very short time-scales (milliseconds) to high selectivity of synthesis gas. Non-volatile fuels (e.g., soy oil, sugar water solutions and the like) should be applied directly to the catalyst where they may fracture to volatile components, which are reformed catalytically to synthesis gas. Volatile fuels (e.g., glycerol and ethanol) can either be applied directly to the catalyst as liquids or can be pre-volatilized in a vaporizer.

In some embodiments, the fuel contains oxygen atoms. In other embodiments, the fuel optionally does not contain oxygen atoms. In some embodiments, the fuel can be an organic compound that has an internal ratio of carbon to oxygen of about 0.4 to about 10. In some embodiments, the fuel is not a pre-vaporized alkanol. In various embodiments, the fuel is glycerol, soy oil, and/or a mixture of organics such as bio-oils.

The fuel is brought in contact with the catalyst in the presence of oxygen gas, and optionally other gasses such as nitrogen, argon, helium, or alkane gasses. The C/O ratio with regard to the flow rate of oxygen gas and fuel can be monitored and controlled to provide the desired product distribution. This C/O ratio may be different for pre-vaporized fuels and those fuels applied directly to the catalyst. The addition of water (or "steam") can be desirable to change the ratio of $H_2$/CO. The relevant operating parameter is referred to as the steam-to-carbon ratio, which can be in the range of $0 \leq S/C \leq 5.0$, or about 0.5 to about 2. The atmospheric pressure of the system can also be controlled, such as from about 0.1 atm, to about 50 atm.

Catalyst Systems

The catalyst used in the methods of the invention can be a metal catalyst, for example, a mixed-metal catalyst. The first metal can be a noble metal or a transition metal. For example, the first metal can be one of the elements of Group VIIA, VIIIA, or IB. Noble or transition metals include Re (Group VIIA), Ni, Pd, Pt, Co, Rh, Ir, Fe, Ru, Os (Group VIIIA), and Cu, Ag, Au (Group IB). The second metal of the mixed-metal catalyst can be a lanthanide, an actinide, or a rare earth element. Useful lanthanides include La and Ce.

Metal oxides of any of the foregoing metals can be used in various embodiments. Alternatively, the metals can be used in an ionic state, reduced state, or in a 'zero' oxidation state. In a particular embodiment, the catalyst is a RhCe catalyst with the Rh and Ce combined in a 1:1 ratio. This ratio can be varied by up to about 10%, 25%, or about 50%, depending on other reaction conditions and the desired outcome of the syngas production process.

In certain specific embodiments, Rh and/or Pt are used at the catalyst, optionally in the presence of Ce and/or La. In other embodiments, Ni can be used alone, or in combination with Rh, Pt, Ce, La, or a combination thereof. The catalyst metals can be impregnated on a ceramic support such as alumina or silica, although any suitable catalyst support may be employed.

In catalytic oxidation of fluid fuels at Carbon to Oxygen (C/O) Ratios of 0.5 to 3.0, the catalyst should provide oxidation of the fuel at stoichiometries above and below the upper flammability limit of the inlet gas stream. In this ratio, "Carbon" is defined as carbon atoms in the fuel and "Oxygen" is defined as oxygen atoms in the oxidant stream (typically $O_2$ or Air).

The geometry of catalyst support can be a ceramic foam, but it can also be spheres or other granular shapes, or the catalyst can be unsupported and instead take the form of wire, mesh, gauze, or any other conformation that allows the catalyst to be exposed to a liquid and/or gas. The process has been successfully repeated using about 1 mm (millimeter) diameter ceramic alumina spheres, obtaining nearly identical results as experiments using a ceramic foam. The foam should not melt at the temperatures that are considered the upper operating temperatures of the system, namely about 400° C. to about 1600° C. In several embodiments, the specific geometry of the support is not an essential consideration. The support should be sufficiently conductive, but all materials that meet the melting point restriction should meet the thermal conductivity requirement of at least 0.1 W/mK.

An advantage of the system disclosed herein is that its normal operation does not result in the accumulation of carbon, or "char," on the catalyst. Even using the system and methods disclosed herein, carbon could deposit on the catalyst in certain circumstances. While carbon may be formed on the catalyst, the process may proceed to remove the carbon so that the carbon does not deactivate the catalyst. Carbon could develop on the catalyst surface if the operating temperature of the reactor becomes too low, for example, less than about 400° C. There are several ways in which the operating temperature can be raised and lowered, thus providing specific operating parameters other than temperature, which is not the only factor for determining when carbon can form in the flash volatilization system. Carbon formation can be visually observed if it forms on the front of the catalyst. However, an experiment called a "burn-off" that flows oxygen over the catalyst can be run on certain standard times. During the burn-off, products coming off the system can be analyzed to determine how much carbon was on the catalyst.

Flash Volatilization Reactor

The reactor system can include a reactor portion of a suitable size and shape. Useful reactors include those that are much smaller than conventional reactors because the residence time is much smaller than in a conventional reactor. This is primarily due to the high operating temperatures, such that the catalytic partial oxidation and flash volatilization occurs in milliseconds versus seconds.

In one embodiment, the reactor is about two (2) centimeters in diameter with a catalyst approximately three (3) cm (centimeter) in length. Smaller reactors are possible having a reactor diameter of greater than about 0.1 millimeter and may be viable for small scale syngas production. A reactor diameter of about 0.1 millimeter is seen as the lower limit of the reactor size as otherwise it may be difficult to consistently administer solid particles to the reactor. In another embodiment, the reactor diameter may have a diameter of up to about five (5) meters. A larger reactor would be able to handle much larger biomass particles because of the larger reactor tube size. Such reactors may be able to handle biomass particles up to about one (1) meter in diameter.

Figure 4:
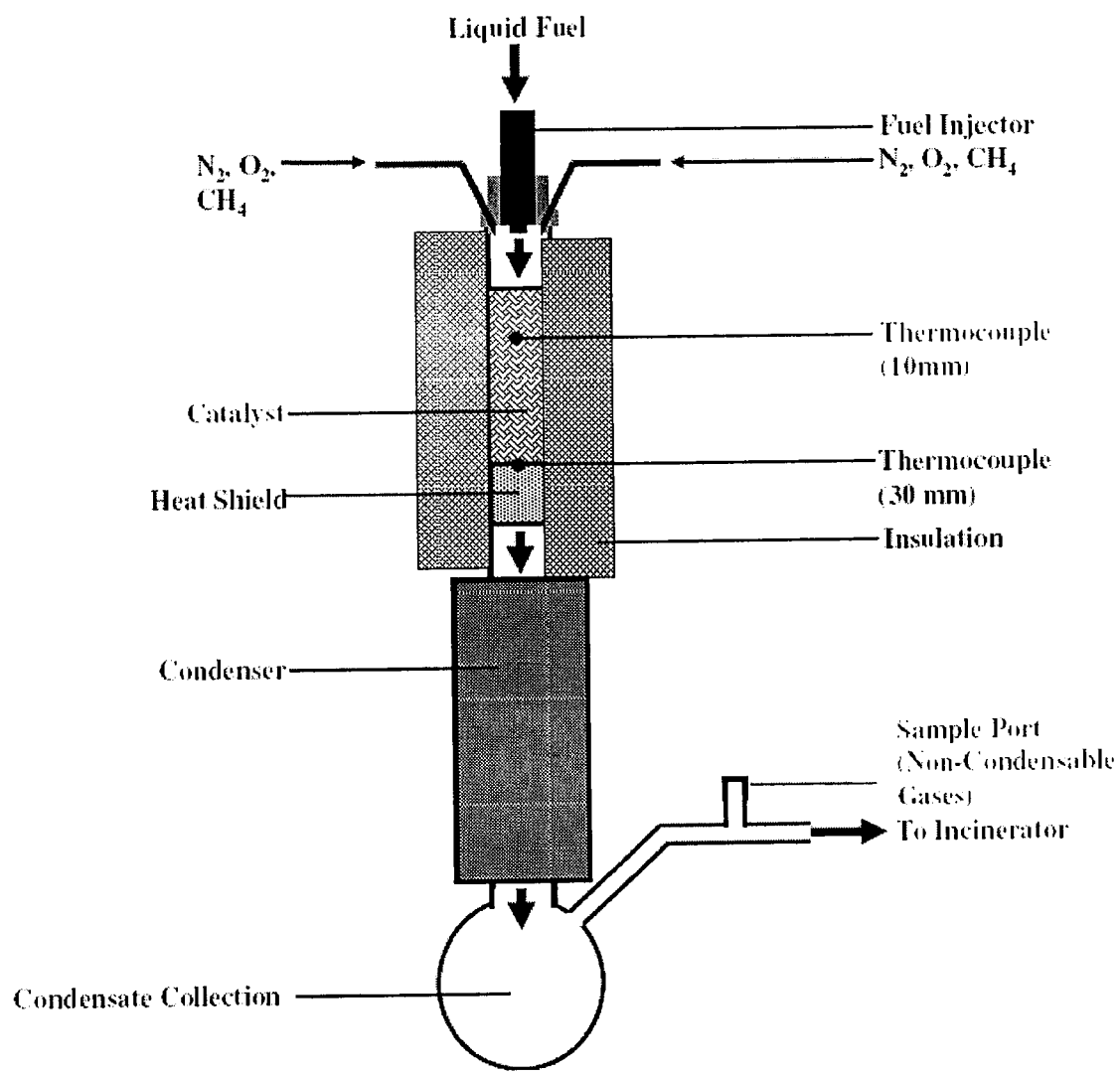
FIG. 4 illustrates a schematic diagram of a nonvolatile liquids processing reactor, according to an embodiment of the invention.
Figure 5A:
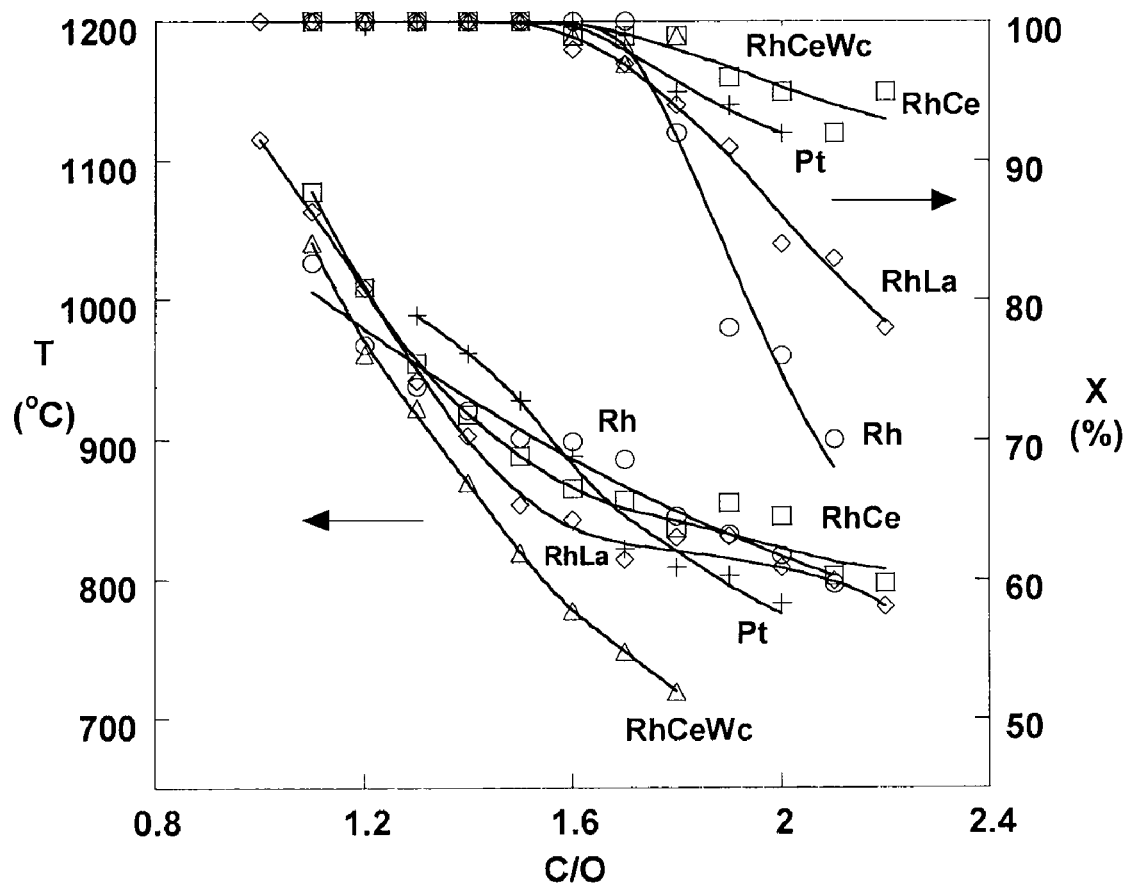
FIGS. 5A-F illustrate the effect of catalytic partial oxidation of ethylene glycol on 5 wt % Pt (+), 5 wt % Rh (○), 5 wt % RhCe (□), 5 wt % RhLa (◇), and 5 wt % RhCe on 5 wt % γ-$Al_2O_3$ washcoat, RhCeWc, (Δ) at 4 SLPM (GHSV approximately $10^5$ hour$^{-1}$). Dashed lines represent equilibrium calculations based on the catalyst back-face operating temperature.
Figure 5B:
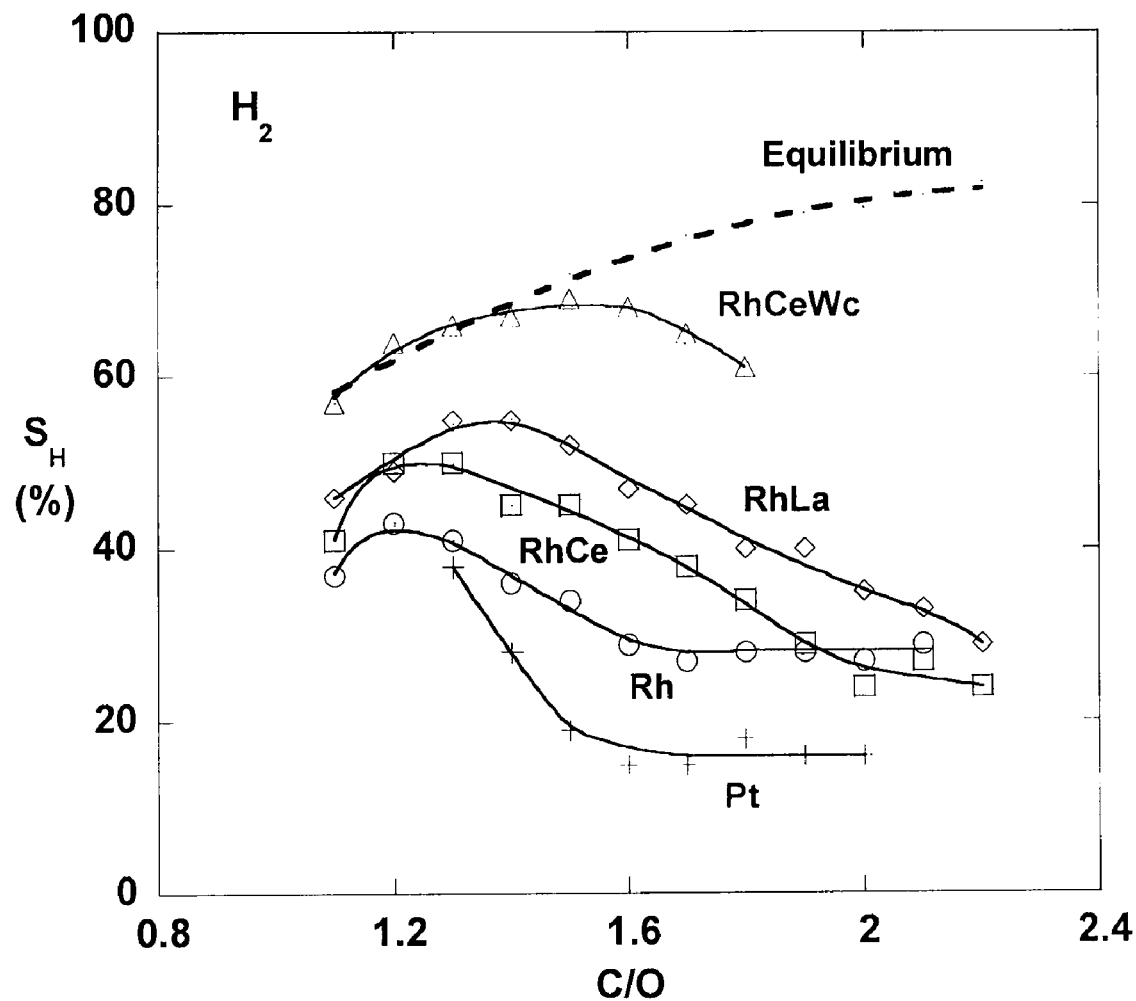
Figure 5C:
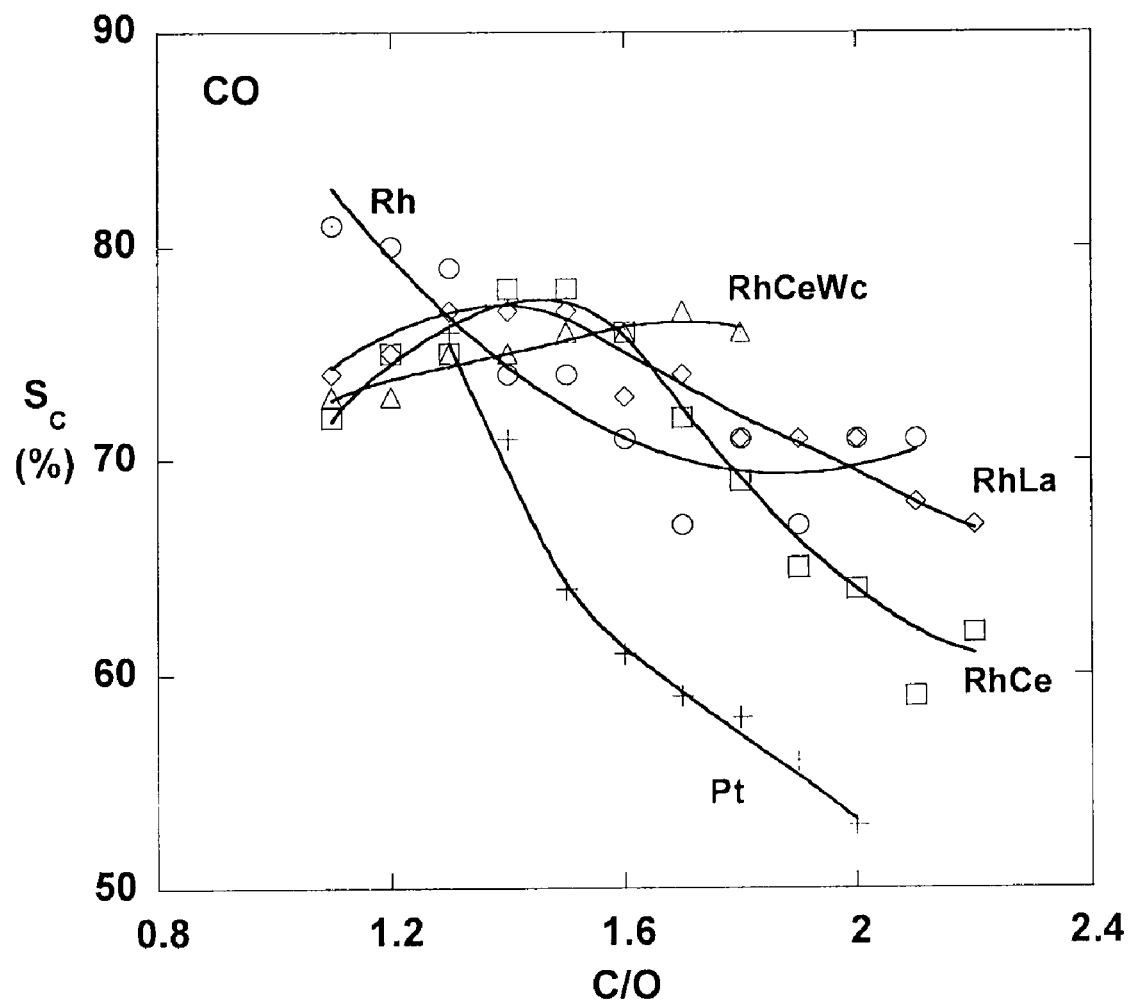
Figure 5D:
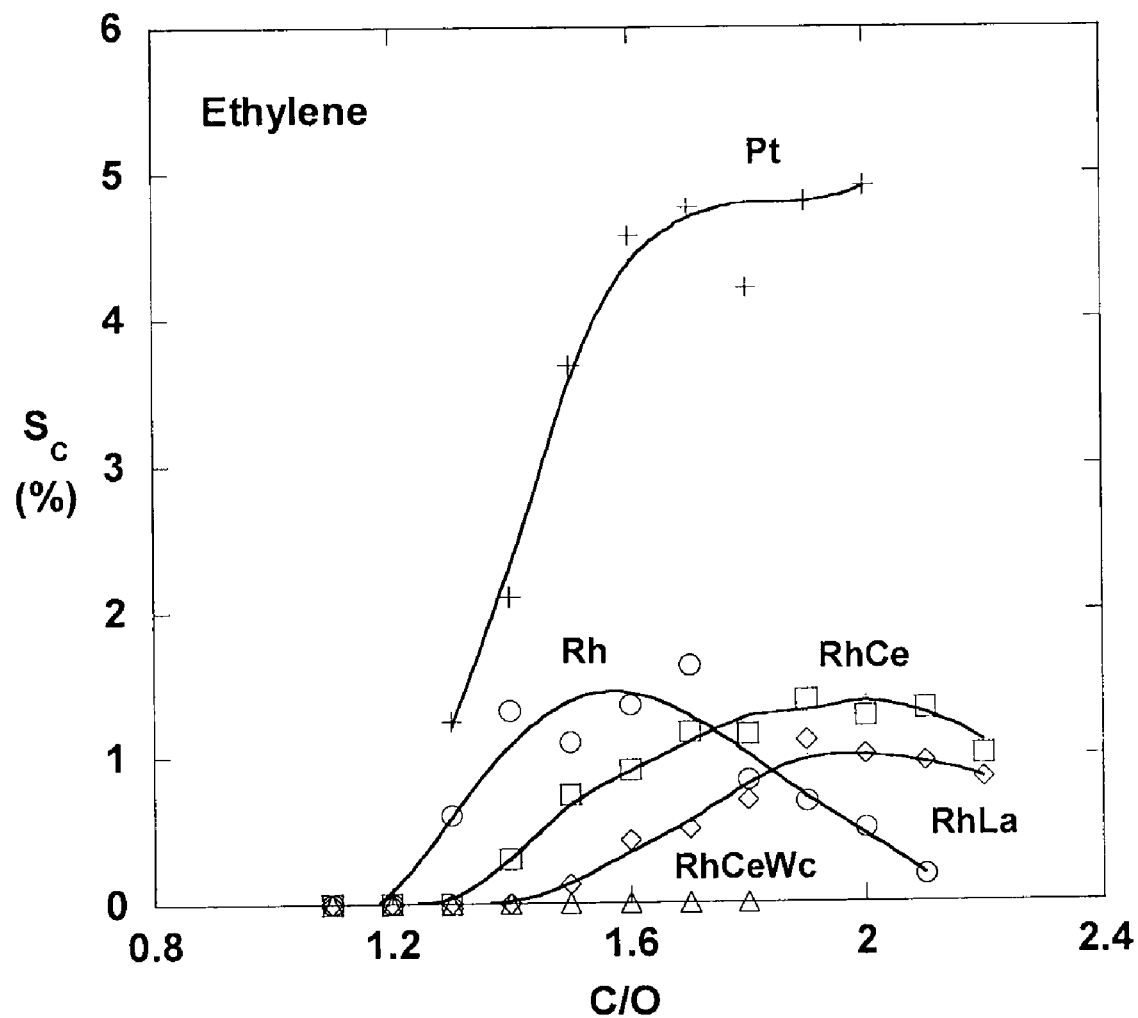
Figure 5E:
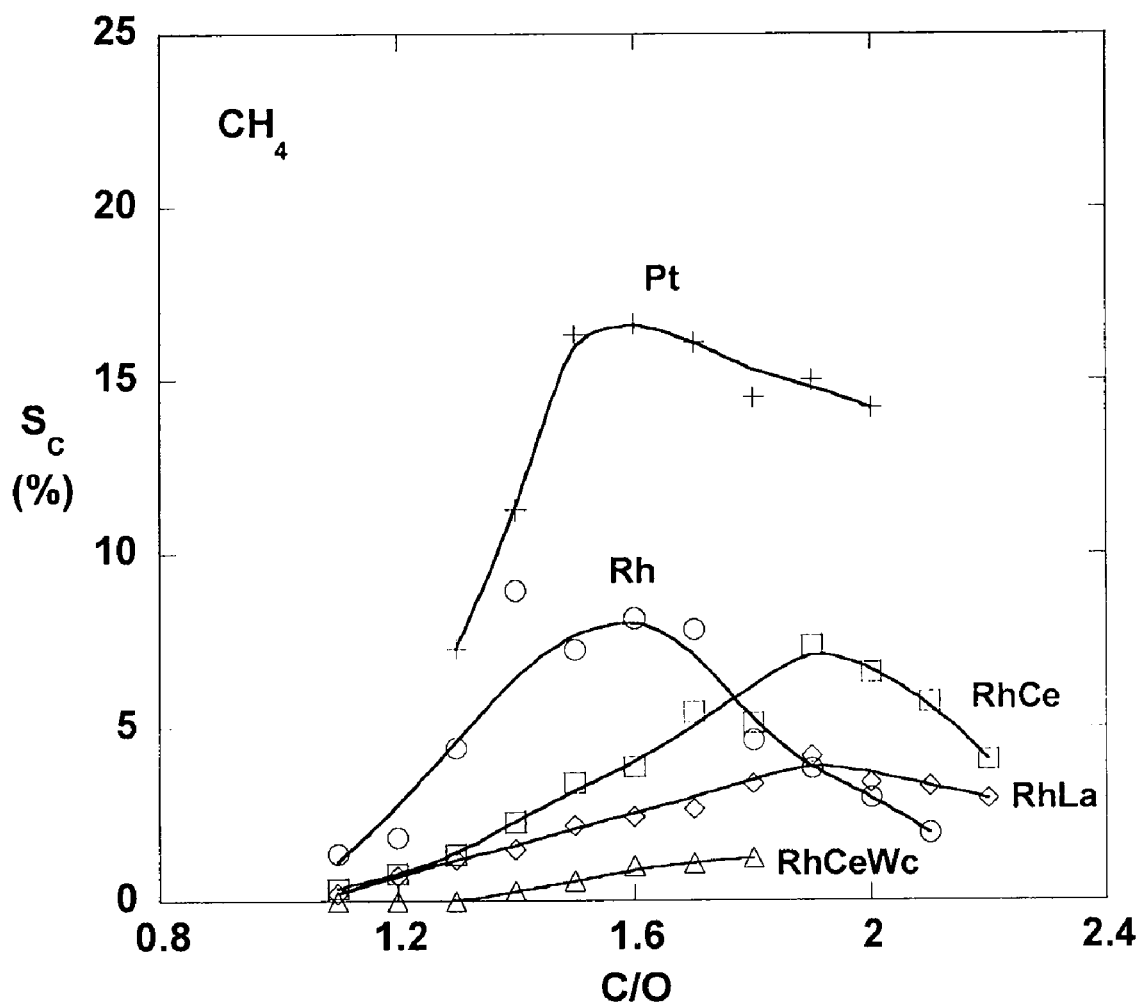
Figure 5F:
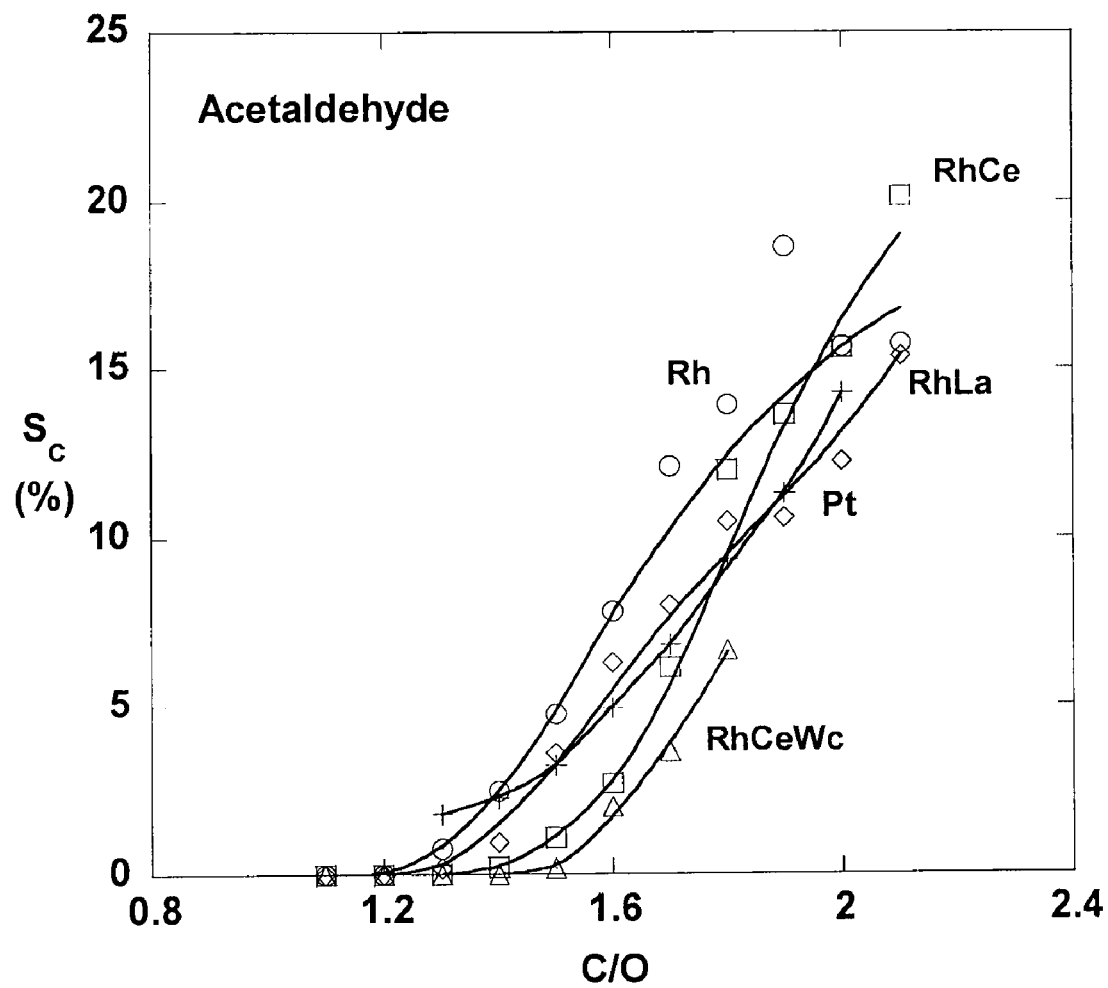
Figure 6A:
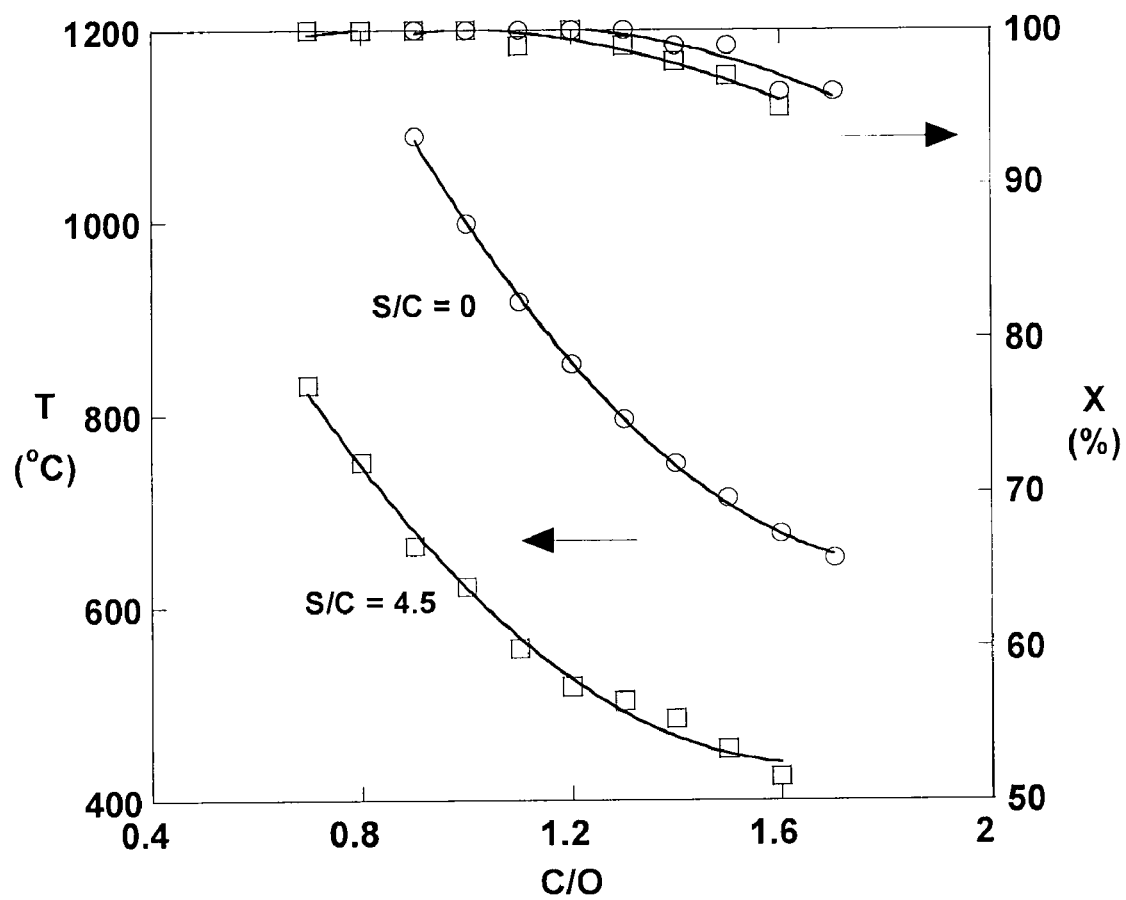
FIGS. 6A-D illustrate the temperature, conversion, and measured selectivities of the autothermal reforming of methanol on a 5 wt % RhCeWc catalyst at 4.0 SLPM (GHSV approximately $10^5$ hour$^{-1}$) with steam-to-carbon ratios (S/C) of zero (○) and 4.5 (□). Dashed lines represent equilibrium calculations based on the catalyst back-face monolith operating temperature.
Figure 6B:
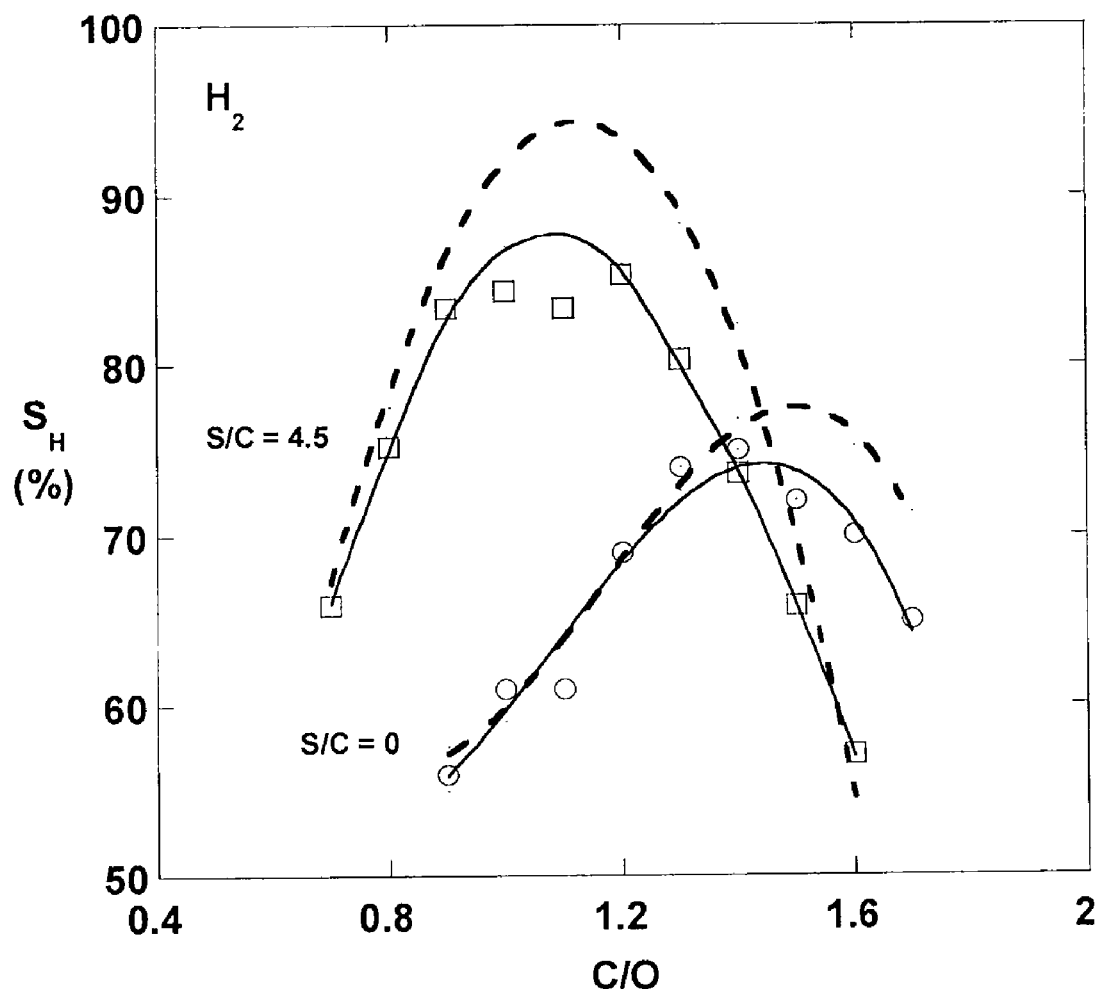
Figure 6C:
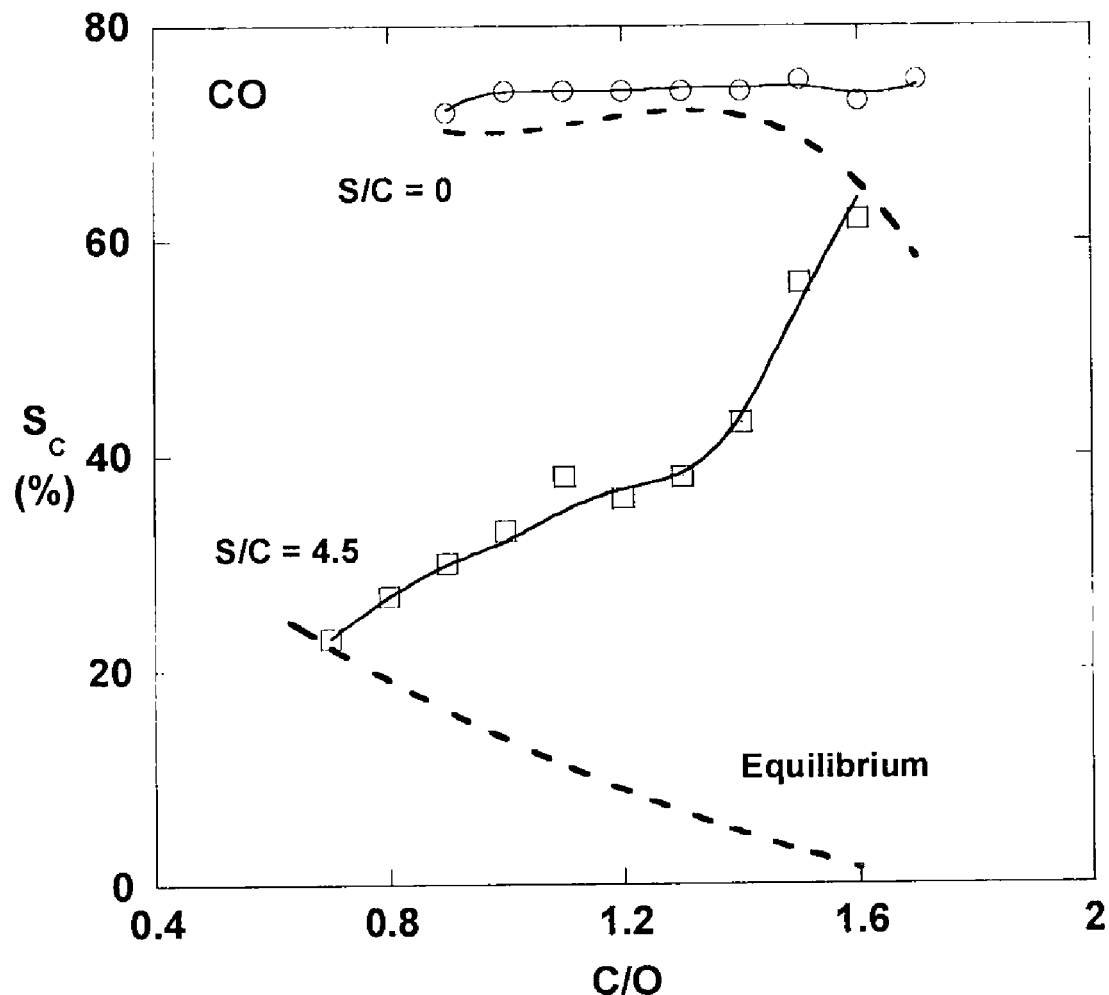
Figure 6D:
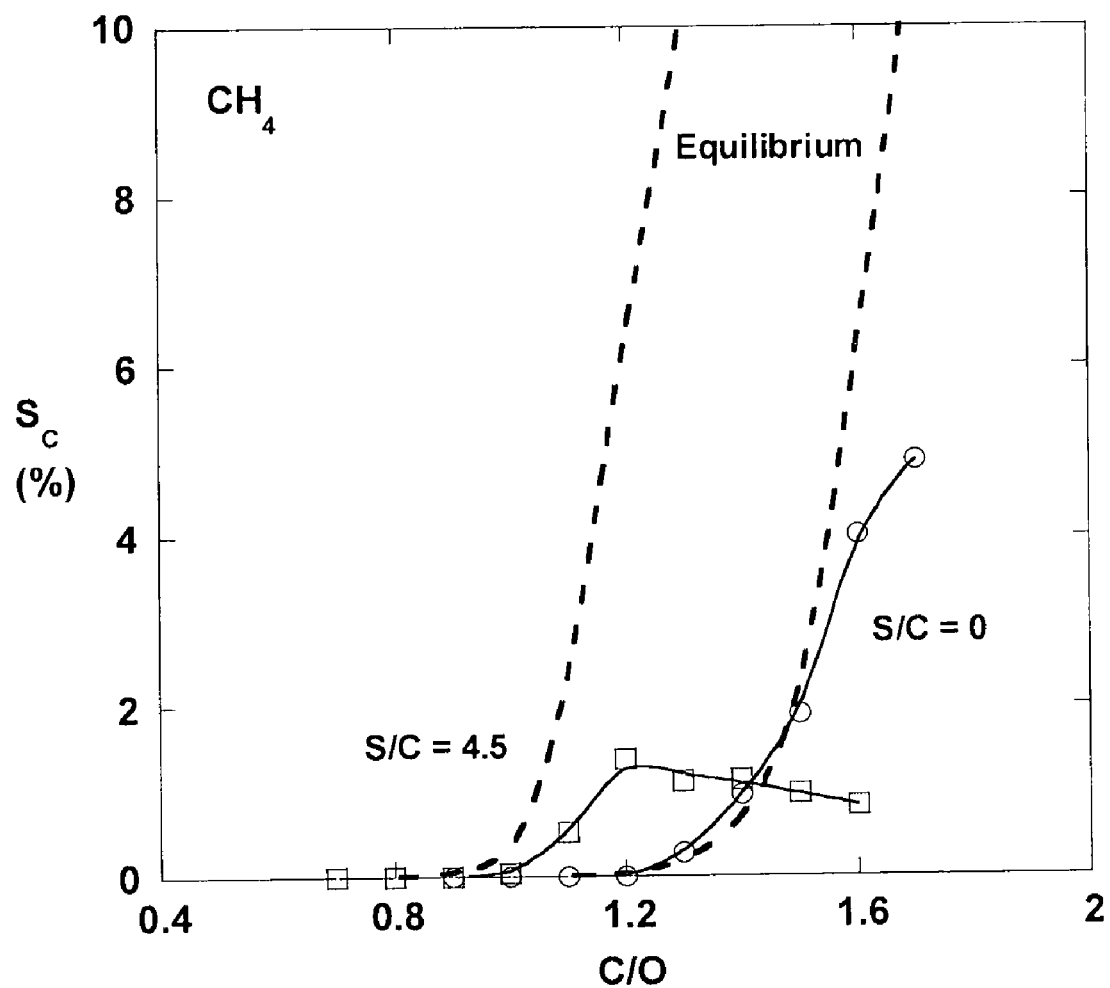
Figure 7A:
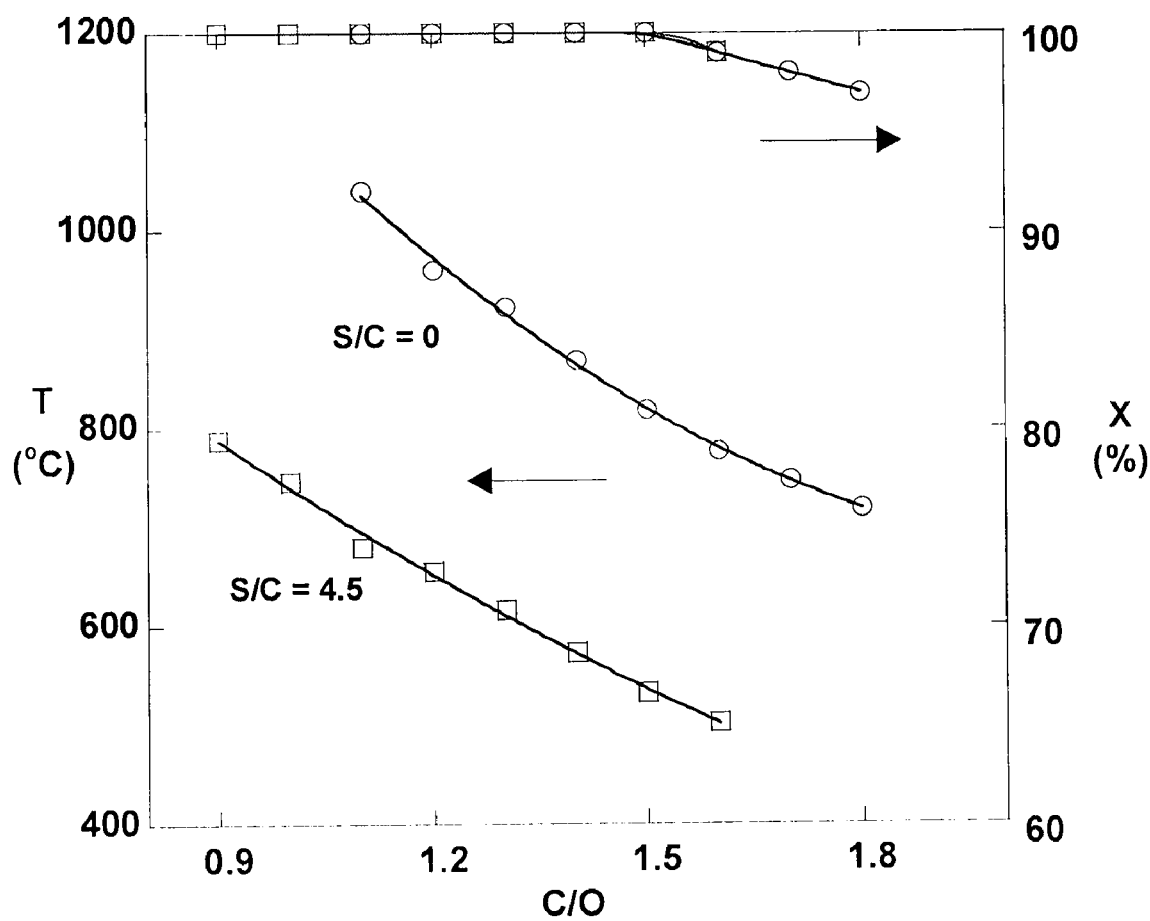
FIGS. 7A-D illustrate the temperature, conversion, and measured product selectivities of the autothermal reforming of ethylene glycol on a 5 wt % RhCeWc catalyst at 4.0 SLPM (GHSV approximately $10^5$ hour$^{-1}$) with steam-to-carbon ratios (S/C) of zero (○) and 4.5 (□). Dashed lines represent equilibrium calculations based on the catalyst back-face monolith operating temperature.
Figure 7B:
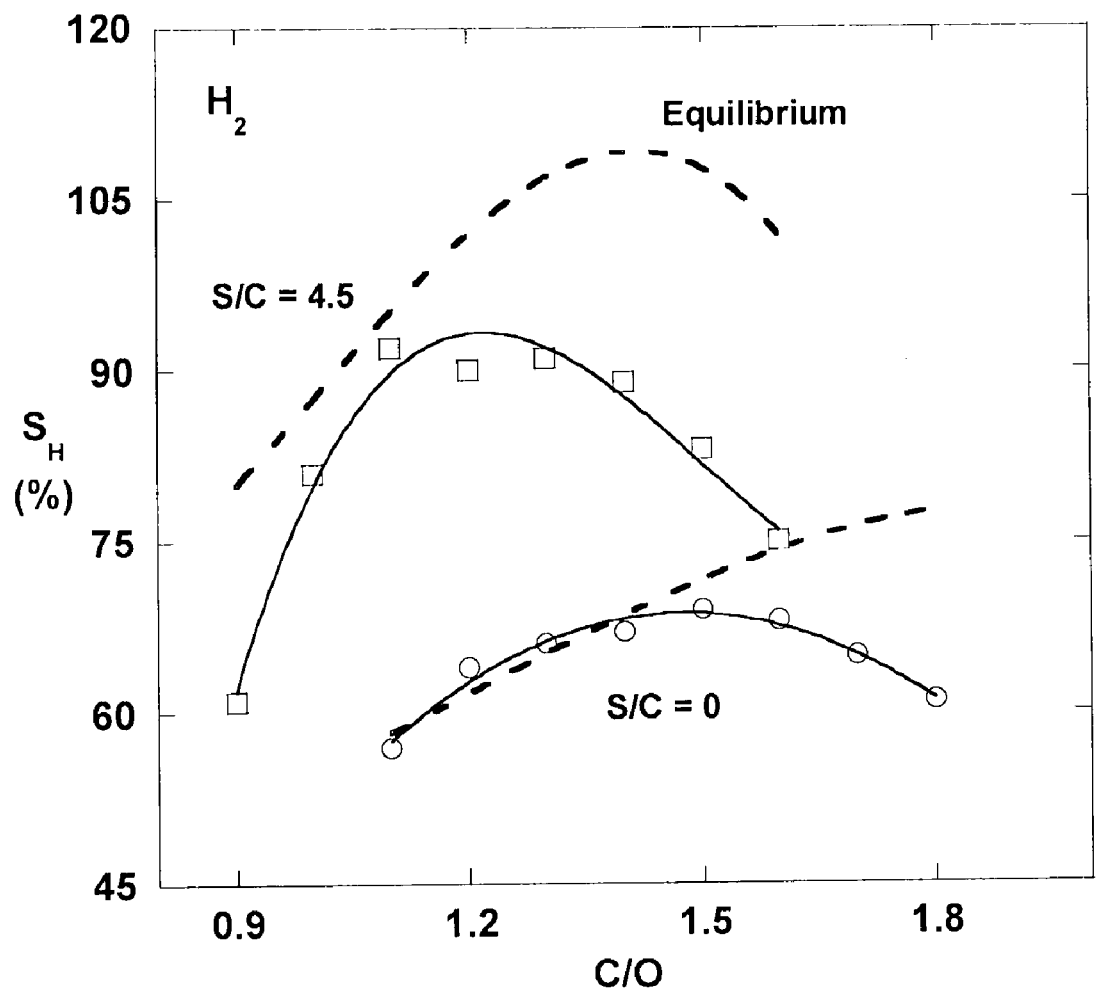
Figure 7C:
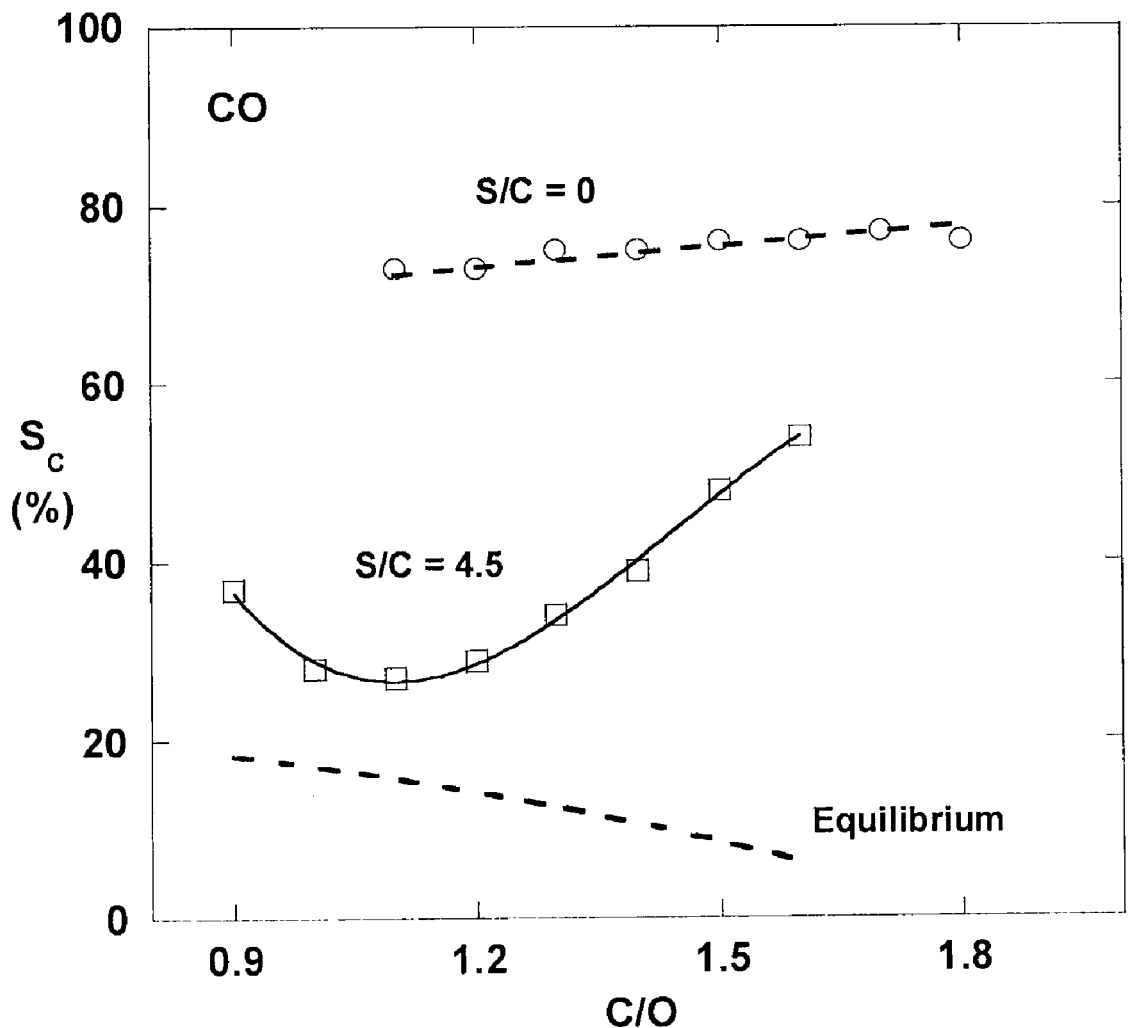
Figure 7D:
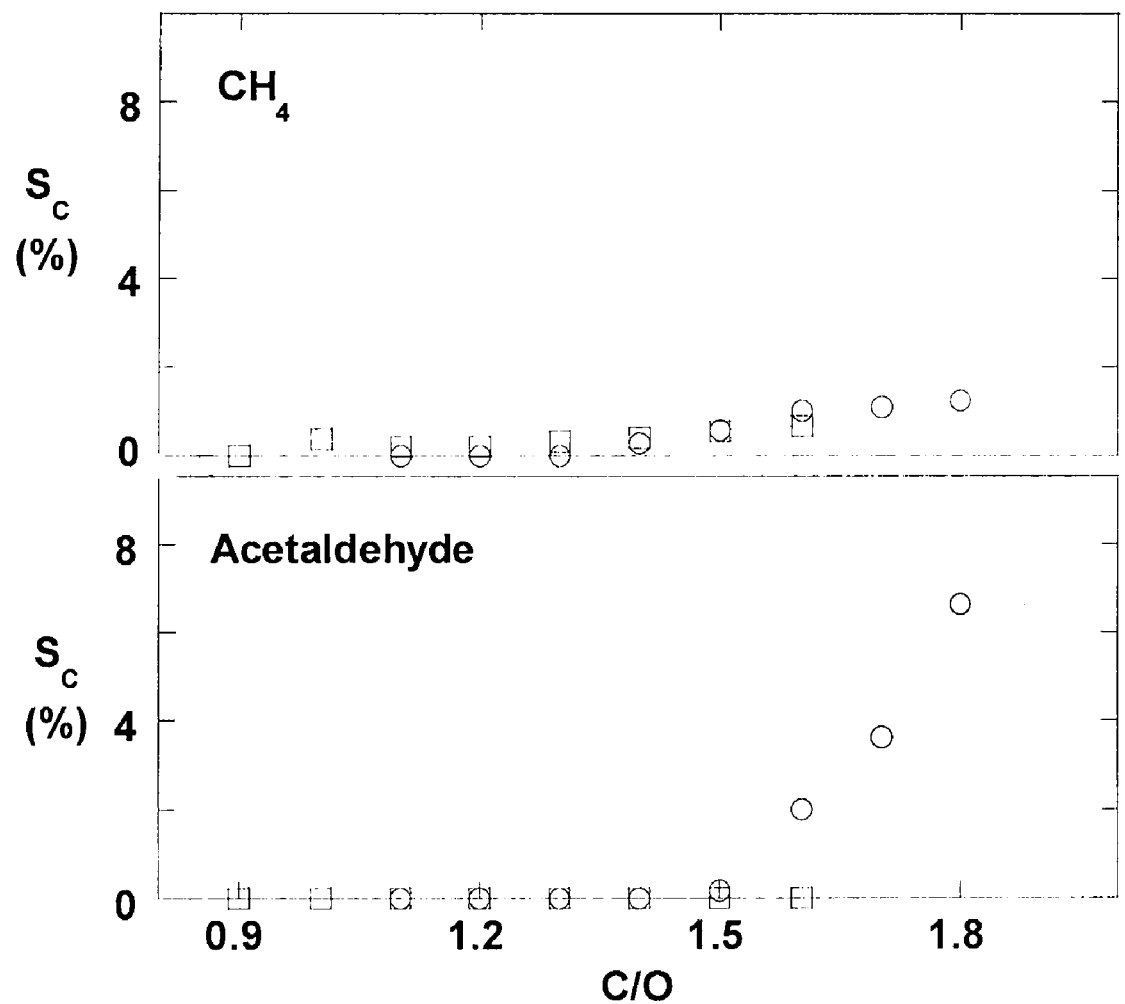
Figure 8A:
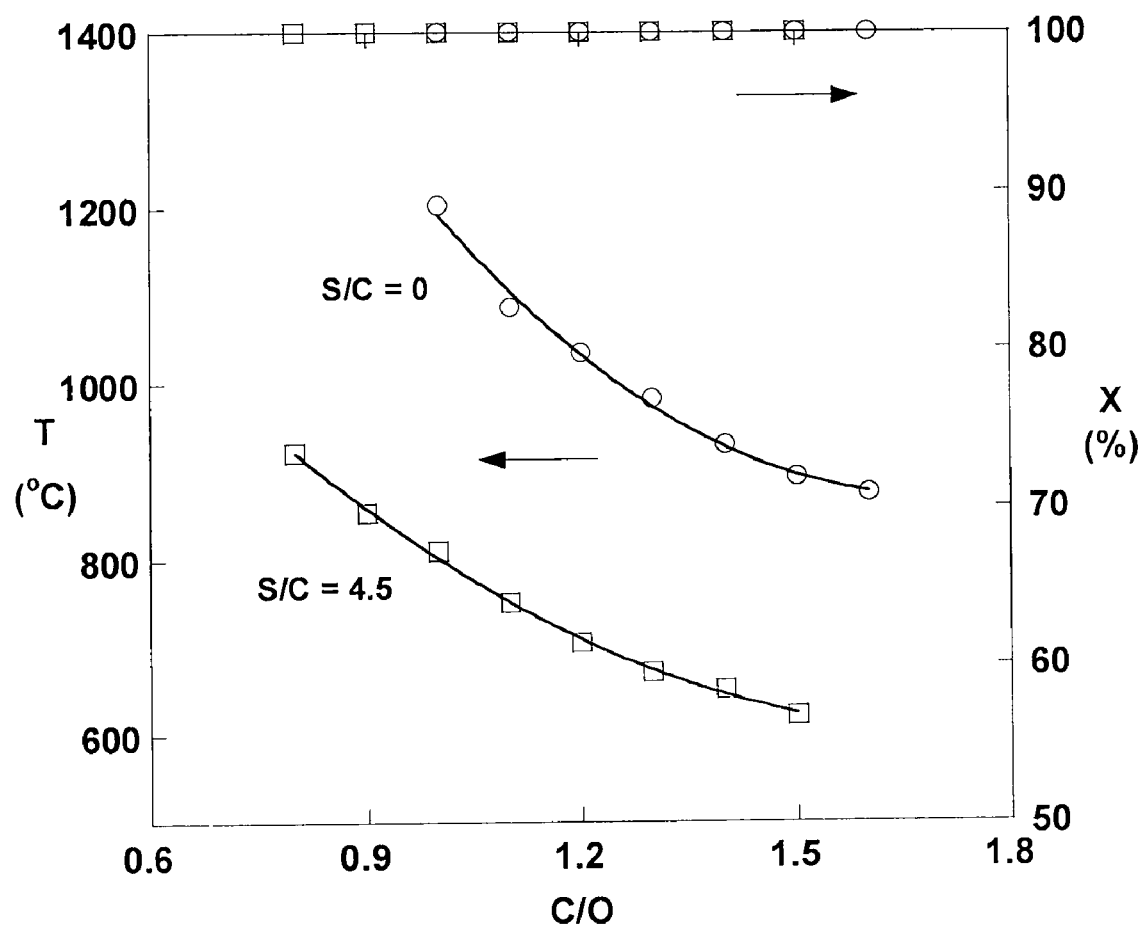
FIGS. 8A-D illustrate the temperature, conversion, and measured product selectivities of the autothermal reforming of glycerol on a 5 wt % RhCeWc catalyst at 4.0 SLPM (GHSV approximately $10^5$ hour$^{-1}$) with steam-to-carbon ratios (S/C) of zero (○) and 4.5 (□). Dashed lines represent equilibrium calculations based on the catalyst back-face monolith operating temperature.
Figure 8B:
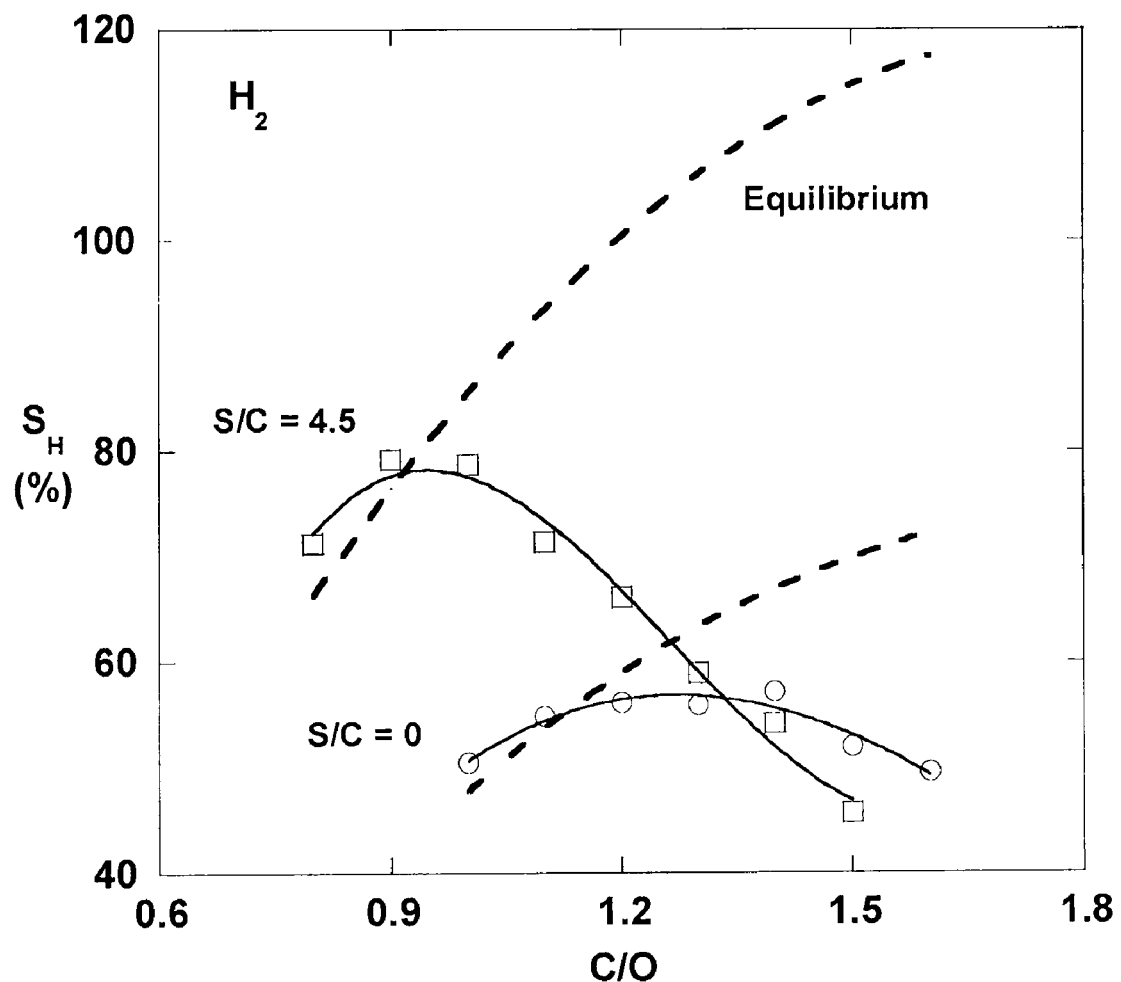
Figure 8C:
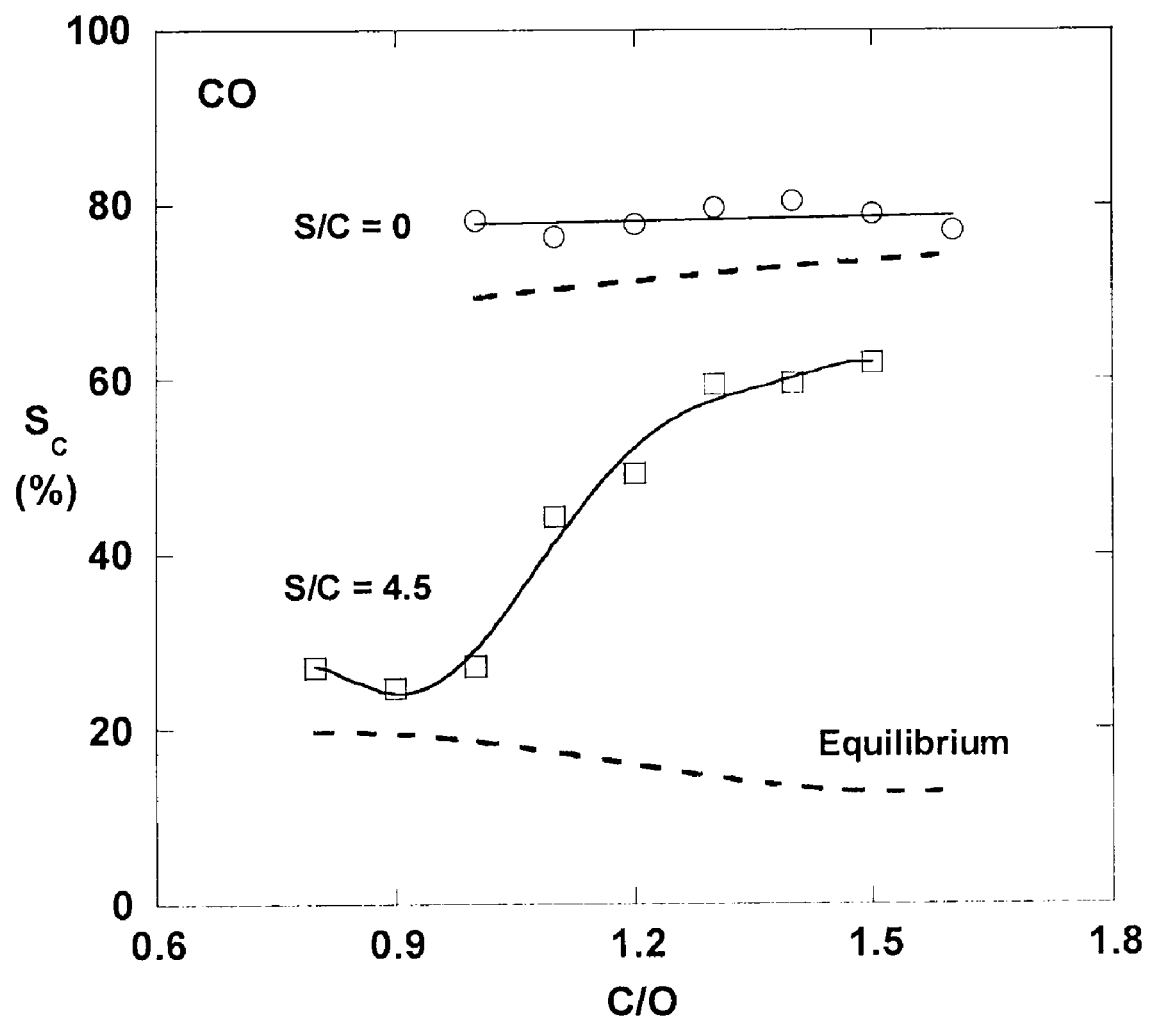
Figure 8D:
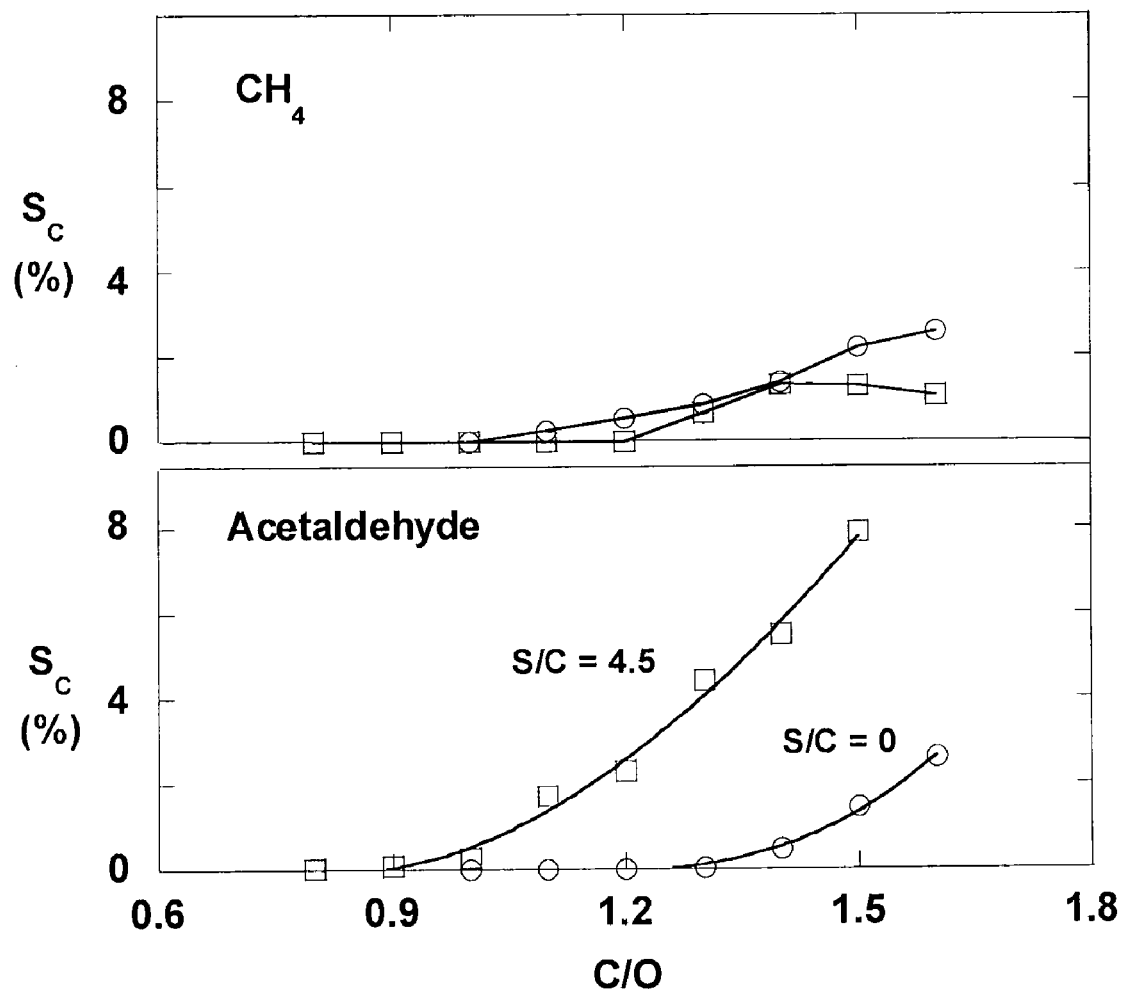
Figure 9:
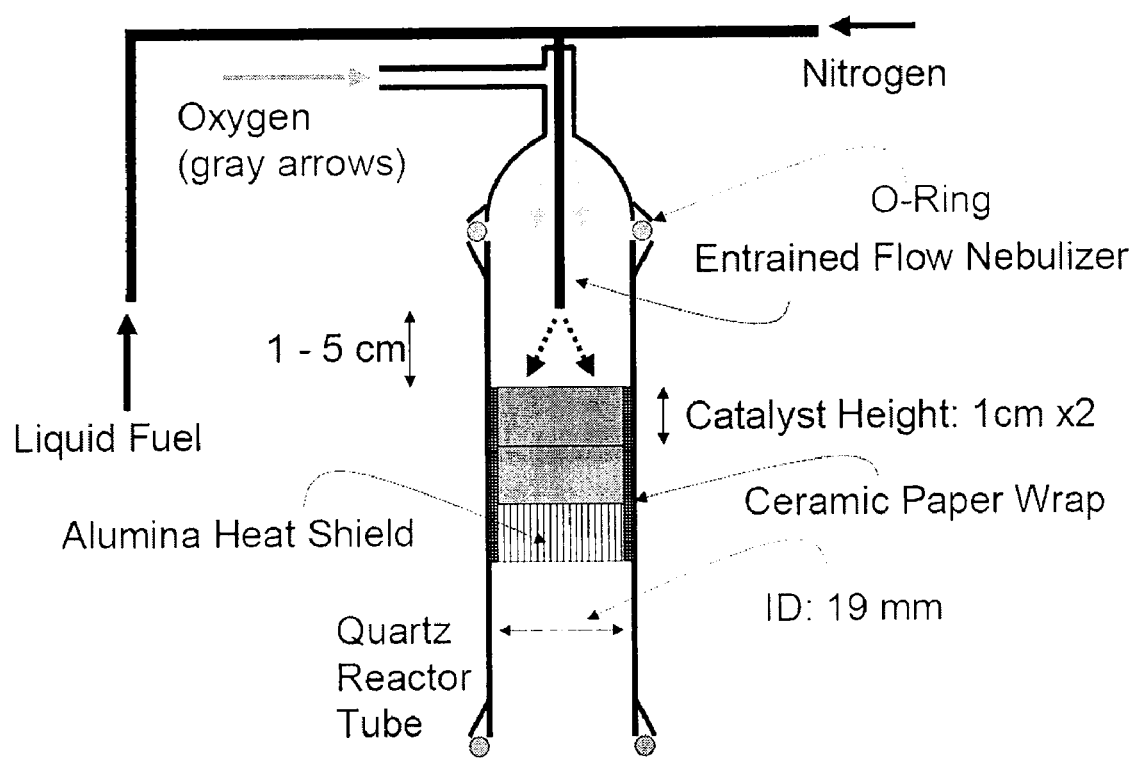
FIG. 9 illustrates an experimental setup for the reactive flash volatilization of glycerol using a Rh—Ce/$Al_2O_3$ catalyst within a quartz reactor.

A reactor tube larger than about five (5) meters in diameter, however, would likely consume an extremely large amount of biomass fuel and therefore be uneconomical from the standpoint of fuel transportation to the plant. In one embodiment, multiple small fuel processing reactors are distributed across the countryside. Possible reactor configurations capable of processing solid fuel as described herein include any type of device that can contain a catalyst and catalyst support together with reactant gases at operating temperatures of at least about 400° C. and allow the final product to exit for use in various applications. The reactor can be of any suitable overall size. In one embodiment, the reactor includes a condenser and condensate collection device as shown in FIG. 4.

In another embodiment, insulation is to aid in controlling heat transfer from the hot reactor. Temperature measurement devices, such as thermocouples, may optionally also be used in any location as desired.

The reactor may further the use of any suitable type of catalyst support. Such supports may include, but are not limited to, ceramic or metal foams, spheres, channels, wires, meshes, gauzes, or any combination of these that can be impregnated with a metal-based catalyst and maintain physical contact with fluid fuel and feed gases. In one embodiment, the catalyst and/or the catalyst support are continually removed and/or replaced during continuous or batch operation. Any suitable type of reactor tubing can be used that is capable of performing the intended function. The reactor tubing may be made from a variety of materials, including, but not limited to, any metal or ceramic capable of separating the reactant gases, solids, and liquids from the external environment. In one embodiment, the catalyst and/or catalyst support are not held in place by the reactor tubing.

Reactant gases necessarily include oxygen ($O_2$) at a molar percentage greater than zero percent and as high as approximately 100%. The remaining fraction may contain, but is not limited to, $N_2$, $H_2O$, $CH_4$, or any other alkane or gaseous oxygenated hydrocarbon, such as ether, and/or any non-reactive diluent such as He or Ar.

The reactor can be initiated by any suitable method that causes the catalyst to be heated to a temperature sufficient to allow the desired reaction to occur within the reactor. In one embodiment, the catalyst is pre-heated to about 400° C., although the invention is not so limited. In other embodiments, the catalyst is pre-heated to and maintained (via the reaction process) at temperatures up to about 1300° C. In one embodiment, the catalyst is at as high as 1600° C. However, in most embodiments, the temperature does not go above about 1300° C. to avoid damage to the catalyst and volatilization of the catalytic metal, which may lead to catalyst loss and deactivation. In one embodiment, a $C_1$-$C_3$ hydrocarbon gas is added as a start-up gas together with the reactant gases, such that the $C_1$-$C_3$ hydrocarbon oxidation is used to heat the reactor.

Many biomass sources contain ash, as defined herein, which may be at levels as high as about 20%. The ash may contain any number of impurities, including, but not limited to, Ca, Mg, K, Si, S, Cl, N, Ph, Al, B, Na, Li, I, Pb, and Fe, or any other compound containing these impurities, such as CaO, MgO, $CaCO_3$, and the like. In some embodiments, the presence of ash is not detrimental to the operation of the catalyst.

Mechanistic Analysis of Conversion of Fluid Biomass to Syngas

Figure 3:
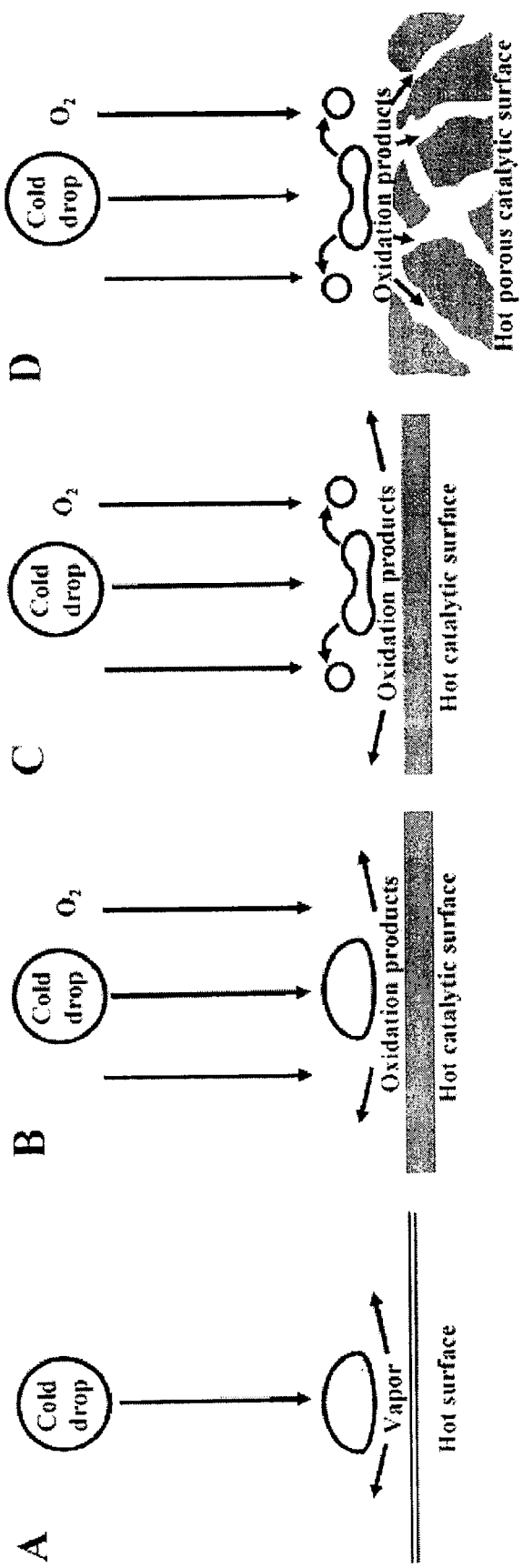
FIG. 3 illustrates sketches of possible configurations of (A) conventional film boiling of a volatile drop on a hot surface, (B) reactive drop volatilization on a hot catalyst surface, (C) drop impingement and breakup on a hot catalytic surface, and (D) drop impingement and breakup on a hot catalytic porous surface.

The processes by which nonvolatile liquids can be converted to $H_2$ and other small molecules, without carbon formation, were analyzed. When a drop of a volatile liquid hits a hot surface, the vaporization at the interface can be fast enough that a gaseous layer is formed, which insulates the drop from the surface. This regime is called "film boiling" or "water droplets on a hot frying pan," as sketched in FIG. 3A, and the heat transfer and mechanisms of this process have been considered extensively (S. Deb, S.-C. Yao, *Int. J. Heat Mass Transfer* 32, 2099 (1989), L. H. J. Wachters, N. A. J. Westerling, *Chem. Eng. Sci.* 21, 1047 (1966), Y. Ge, L.-S. Fan, *Phys. Fluids* 17, 027104 (2005), B. S. Gottfried, C. J. Lee, K. J. Bell, *Int. J. Heat Mass Transfer* 9, 1167 (1966)). Nonreactive drop breakup upon impact has also been studied (M. Bussmann, S. Chandra, J. Mostaghimi, *Phys. Fluids* 12, 3121 (2000)), as has nonreactive drop impact upon heated porous surfaces (S. Chandra, C. T. Avedisian, *Int. J. Heat Mass Transfer* 35, 2377 (1992)).

The situation in experiments described herein can be considerably different than conventional film boiling. Without chemical reaction, the surface would cool rapidly by heat transfer and boiling of the liquid. Instead, the process relies on the chemical reaction of the volatile products (the parent liquid as well as $H_2$ and other smaller fragments) to continuously maintain the surface temperature high enough to sustain steady-state impact and decomposition of drops. A possible configuration for a drop with reaction occurring on a hot catalyst surface is sketched in FIG. 3B. The process may rely on reaction in the gaseous layer between the drop and the hot catalyst to continuously generate gaseous products and heat, and the process can continue until all fuel is volatilized, either in the initial drop or in successive smaller drops that form from the primary drop.

The sequence of surface and homogeneous reaction steps in reactive flash volatilization is unknown. It may be that the initial reaction step is partial vaporization and pyrolysis upon impact of the cold drop with the hot surface. Rebound then allows oxidation reactions, and film boiling permits gas and surface reactions. Once the drop or its fragments enter the ceramic foam, reactive decomposition may be very rapid.

The overall process is complex because of possible drop breakup dynamics and the structure of the porous catalyst surface on which the process occurs. Some of these issues are illustrated schematically in FIGS. 3C and 3D. The velocity of the drop above the surface can be calculated to be approximately 1 m/s (meter/second), so the impact of the drop on the surface could promote rapid breakup into smaller drops by momentum transfer. The initial impact probably involves the cold liquid making direct contact with the surface. These events are estimated to involve microsecond times, where gradients and sequences of events are extremely large and difficult to predict.

This process appears to be general for any fuel, because the hot catalyst surface can pyrolyze and oxidize the liquid at the interface into products that are easily oxidized. Heavy fuels such as residual petroleum fractions, yellow grease (used cooking oil), and crude soy oil are processable with little or no pre-treatment. At the observed reactor temperatures of 800 to 1000° C., the presence of small amounts of impurities such as phosphorous, potassium, nitrogen, and other small organics present in renewable feedstocks are not, or are minimally, detrimental to the catalyst because they may be volatile. Varying amounts of moisture within feedstocks can actually improve the $H_2$ yield and further suppress carbon formation. The process can be scalable over a wide range of capacities. For example, the currently tested system processed approximately 0.6 kg (kilogram)/day of fuel using 150 mg (milligram) of Rh, thus a catalyst disc 5 cm (centimeter) in diameter would process approximately 5.2 kg (kilogram)/day under identical conditions. A small single-orifice automotive fuel injector was used to obtain sufficiently low flows over the entire catalyst surface. Larger systems could use larger multiport injectors, multiple injectors, or different methods for uniform drop formation, such as nebulizers or pressurized nozzles.

Many technologies require fast drop volatilization without carbon formation. Diesel engines require rapid combustion of nonvolatile fuels, but the impact of drops on walls can be generally avoided to prevent coke formation. New engine technologies could use drop volatilization at a catalytic surface to improve diesel combustion and reduce pollutants. Heavy oils such as residual petroleum fractions and biomass-derived liquids can be pyrolyzed and combusted in fixed or fluidized beds, but this generally involves a reducing zone where carbon forms, followed by an oxidizing zone where the carbon can be burned off. A single-zone catalytic process would be much smaller and simpler, and the use of catalysts would allow tuning of selectivities that is not possible with flame combustors. Catalytic processes also eliminate or strongly reduce pollution associated with flame combustors.

Reactive drop volatilization is a simple and readily adaptable method to convert nonvolatile fuels into $H_2$ and CO for large as well as small scales of production, such as onboard vehicle reforming. It allows the intensification of the process into millisecond time scales. The conversion of other nonvolatile biomass mixtures such as emulsions, slurries, and dissolved powders can also be accomplished. Reference may be made to J. R. Salge et al. *Science,* 314. 801-804 (2006), incorporated herein by reference which describes certain aspects of this disclosure.

The following Examples are illustrative of the above invention. One skilled in the art will readily recognize that the techniques and reagents described in the Examples suggest many other ways in which the present invention could be practiced. It should be understood that many variations and modifications may be made while remaining within the scope of the invention.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

EXAMPLES

Catalyst and Catalyst Supports

The catalyst support was an 80 pore per linear inch (ppi), 17 mm (millimeter) OD, and 10 mm (millimeter) length cylindrical a-alumina (92% $Al_2O_3$, 8% $SiO_2$) foam. The catalyst foams comprised 80 ppi 92% alumina/8% silica foam monoliths from Vesuvius Hi-Tech Ceramics Co., Alfred, N.Y. The catalyst foams were coated with approximately 2.5 wt % Rh and 2.5 wt % Ce. The Rh—Ce coated foams were coated using a "wet impregnation method" as is well-known in the art, including dropping an aqueous solution of $Rh(NO_3)_3$ and $Ce(NO_3)_3.6H_2O$ onto the foam. The Rh—Ce coated foams were then dried and calcined in air at 600° C. for 6 hours.

The rhodium (Rhodium(III) nitrate solution), Rh 10% purity, w/w (containing Rh), (Item #12633) was supplied by Alfa Aesar, Ward Hill, Mass. The cerium (Cerium(III) nitrate hexahydrate) (99.99% purity) was supplied by Sigma-Aldrich, St. Louis, Mo.

Reactor Start-Up and Shutdown

To initiate the autothermal reforming of the nonvolatile biomass, $CH_4$ and air were passed over the catalyst at 350° C. and reacted to form synthesis gas ($H_2$ and CO), releasing high levels of heat. Once the catalyst surface reached temperatures more than about 1000° C., a fuel injector shot biomass fluid (optionally mixed with the reactant gases) directly onto the hot catalyst surface. Gradually, the inlet stoichiometries for the reactant gases and fluid fuel were adjusted to enable the fluid fuel to autothermally reform in air without the addition of $CH_4$.

When the reactor was shut-down, the start-up gas was reintroduced into the reactor, and the solid feeding was terminated. The stoichiometry of the start-up gas and the reactant gases was adjusted to produce back-face temperatures of approximately 1000° C. The reactor was operated at this temperature for approximately 10 minutes. Then, one of the reactant gases (i.e., oxygen) and the start-up gas (i.e., methane) were removed from the reactor, which was then cooled by the other reaction gas, namely nitrogen.

Product Analysis

Product gases were analyzed using an HP 6890 GC equipped with a capillary column (J&W Scientific PLOT-Q) and thermal conductivity detector (TCD). This system was capable of separating and detecting permanent gases, higher hydrocarbons, olefins, aromatics, alcohols, ketones, and aldehydes. Compounds that condensed in the condenser were considered unreacted fuel and reflected in the fuel conversion. Some of these condensed compounds may be reacted fuel, and thus, the actual fuel conversion may be higher than reported. The average molecular weights of compounds were used to calculate approximate C/O compositions flowing through the reactor.

Product selectivities were calculated on an atomic basis. C and H atom selectivities were calculated as the molar ratio of a specified product to the sum of all products, scaled to account for stoichiometry. For fluids containing some moisture, the water was not considered fuel. Thus, if $H_2$ is produced from the conversion of water and fuel, the $H_2$ selectivity could exceed 100%. The carbon atom balance was closed to determine the fuel conversion, and the oxygen atom balance was closed to determine the water molar flow rate.

Example 1

Reactive Flash Volatilization of Soy Oil

Results for the catalytic reactive flash volatilization of refined soy oil (the triglyceride of $C_{18}$ and $C_{16}$ fatty acids) as fuel are shown in FIG. 1A for conversion and temperature, and in FIG. 1B for selectivities to $H_2$ and all carbon-containing products. The temperature 10 mm (millimeter) downstream from the front face, which can be generally cooler than the front face where oxidation reactions occur, decreased from 1100° C. (glowing bright orange) to 800° C. (dull red) as C/O increased from 0.8 to 1.2. The lower C/O limit can be set by thermal destruction of the catalyst (sintering of Rh), and the higher C/O limit can be set by carbon formation that shuts down the process.

This process was run for more than 20 hours on a given catalyst and it was repeated on several catalysts. In all cases, no deactivation was observed (<2% change in conversion or selectivity over 20 hours) as long as the catalyst was not overheated. A higher C/O ratio caused deactivation through carbon formation in the catalyst, but the activity could be restored quickly, by decreasing C/O or by adding $CH_4$, to burn off this carbon.

The soy oil used was purchased from a local grocery store ("Crisco All Natural Pure Vegetable Oil", Ingredient: Soybean Oil, manufactured by The J. M. Smucker Company, Orrville, Ohio).

Example 2

Reactive Flash Volatilization of Biodiesel

Figure 2:
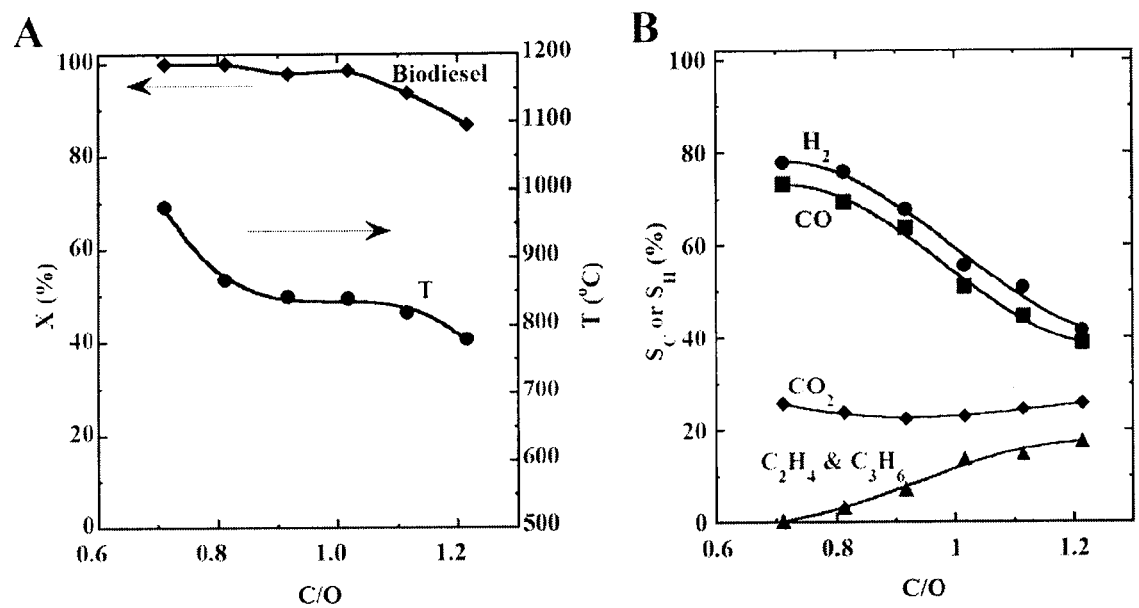
FIG. 2 illustrates reactive flash volatilization of biodiesel: (A) conversion and temperature, and (B) selectivities to $H_2$ and carbon products. Conversion is high and selectivities are comparable to those observed using soy oil.

Results for an experiment similar to Example 1 were obtained with biodiesel. These results are shown in FIG. 2. Biodiesel (the methyl ester of the fatty acids from the triglyceride ester made by transesterification of soy oil) boils without decomposition at >300° C., so vaporization of biodiesel without carbon formation is possible. It has been previously shown (R. Subramanian, L. D. Schmidt, *Angew. Chem. Int. Ed.* 44, 302 (2005)) that biodiesel can be converted into $H_2$ and CO, or into olefins, in a similar reactor system where the biodiesel was vaporized by heating the walls of the reactor above the catalyst to 300° C., and a heat shield-mixer was inserted between the vaporized fuel and the catalyst. In this Example, no external heat was added, so fuel and air were fed at room temperature. FIG. 2 shows that conversions and selectivities with biodiesel are similar to those seen when using nonvolatile soy oil directly.

Example 3

Reactive Flash Volatilization of Aqueous Solutions

As another Example, a glucose-water solution was fed to the reactor through the fuel injector. Glucose (35% by weight) was dissolved in water. The solubility of glucose in water at 20° C. is 38% by weight. A steady-state operation was unable to be maintained under the instant conditions without adding $CH_4$ along with the sugar, and the lowest $CH_4$ level able to be maintained at C/O=0.8 was three carbon atoms from methane per carbon atom from glucose. Again, performance was comparable to that seen with soy oil or biodiesel, with >99% glucose conversion and approximately 70% $H_2$ selectivity.

Little optimization of catalyst or conditions was attempted in Examples 1-3. Preheat in the volatilization zone or in the fuel injector can increase stability and performance. Additionally, smaller drop sizes can increase the range of operation.

The glucose (α-D-Glucose, anhydrous, 96%) was purchases from the Sigma-Aldrich Company, St. Louis, Mo.

Example 4

Scaling of Reactive Flash Volatilization

The systems tested in Examples 1-3 above processed approximately 0.6 kg (kilogram)/day of fuel using 150 mg (milligram) of Rh, thus a catalyst disc 5 cm (centimeter) in diameter would process about 5.2 kg (kilogram)/day under identical conditions. A small single-orifice automotive fuel injector was used to obtain sufficiently low flows. However, larger systems can use larger multi-port injectors, multiple injectors, or different methods to provide drop formation, such as nebulizers or pressurized nozzles, to provide sufficiently low flow over the catalyst surface.

Example 5

Autothermal Reforming of Methanol, Ethylene Glycol, and Glycerol

The autothermal reforming of methanol, ethylene glycol, and glycerol on noble metal catalysts was investigated. These three molecules represent the first three carbohydrates of formula $C_n(H_2O)_nH_2$ that are both volatile and structurally similar to larger molecules produced in nature such as glucose. Glycerol is also a side-product in the production of biodiesel from triglycerides, and ethylene glycol and glycerol can be produced by the hydrogenolysis of sorbitol (E. Tronconi, N. Ferlazzo, P. Forzatti, I. Pasquon, B. Casale, L. Marini, *Chem. Eng. Sci.*, 47, 2451 (1992)). This set of molecules is highly oxygenated with a hydroxyl group on each carbon atom and an internal carbon-to-oxygen ratio (C/O) equal to 1. This presents a challenge for gas-phase reforming with unique chemistry and a significant thermodynamic limitation for synthesis gas production relative to the reforming of alkanes.

Due to high oxygen content, carbohydrate conversion to synthesis gas can only occur stoichiometrically through a decomposition reaction. The decomposition can be highly endothermic for methanol (n=1), ethylene glycol (n=2) and glycerol (n=3), $$C_n(H_2O)_nH_2 \rightarrow nCO+(n+1)H_2 \quad (1),$$

with $\Delta H°=90$, 173, and 245 kj (kiloJoule)/mole for n=1, 2, and 3. Autothermal reforming therefore requires thermal energy by producing some complete oxidation products in the highly exothermic combustion reaction, $$C_n(H_2O)_nH_2+(n+0.5)O_2 \rightarrow nCO_2+(n+1)H_2O \quad (2),$$

with $\Delta H°=-676$, $-1118$, and $-1570$ kJ (kiloJoule)/mole for n=1, 2, and 3. Oxidation at a stoichiometry between Eqns. 1 and 2 permits the catalytic partial oxidation (CPOx) of highly oxygenated molecules for which the conventional equation has been defined by (M. L. Cubeiro, J. L. G. Fierro, *J. Catal.*, 179, 150 (1998)), $$C_n(H_2O)_nH_2+(n/2)O_2 \rightarrow nCO_2+(n+1)H_2 \quad (3)$$

as an exothermic reaction with $\Delta H'=-193$, $-393$, and $-603$ kJ (kiloJoule)/mole for n=1, 2, and 3. This reaction provides sufficient heat internally to maintain a temperature of 600-1200° C. capable of achieving equilibrium product concentrations at millisecond residence times. Methanol CPOx has been carried out on both Pt and Rh catalysts on α-alumina monoliths with typical $H_2$ selectivity of 65-75% with conversions greater than 90% at low reactant C/O ratios (B. E. Traxel, K. L. Hohn, *Appl. Catal., A* 244, 129 (2003)). Further improvements in $H_2$ selectivity may require steam addition to the reactant mixture.

Traditional steam reforming reacts fuel and steam in a highly endothermic process, $$C_n(H_2O)_nH_2+(n)H_2O \rightarrow nCO_2+(2n+1)H_2 \quad (4),$$

with $\Delta H°=49$, 91, and 123 kJ (kiloJoule)/mole for n=1, 2, and 3. Steam reforming has been examined at low temperatures in the aqueous phase with selectivity to $H_2$ as high as 76% from glycerol and 96% from ethylene glycol over tin-promoted Raney-nickel catalysts (G. W. Huber, J. W. Shabaker, J. A. Dumesic, *Science*, 300, 2075 (2003)). The gas-phase steam reforming of glycerol on $Ru/Y_2O_3$ catalysts exhibited $H_2$ selectivity of approximately 90% with a steam-to-carbon ratio (S/C) 3.3 and complete conversion at 600° C. has been reported (T. Hirai, N. Ikenaga, T. Miyake, T. Suzuki, *Energy & Fuels.* 19, 1761 (2005)).

Fuel conversion can occur faster and without an external heat source applied to the catalyst in a process called autothermal steam reforming (ATSR) where oxygen, steam and fuel are all reactants, $$C_n(H_2O)_nH_2+(n/2)H_2O+(n/4)O_2 \rightarrow nCO_2+(3/2n+1)H_2 \quad (5),$$

with $\Delta H°=-72$, $-160$, and $-240$ kJ (kiloJoule)/mole for n=1, 2, and 3. Examination of the ATSR of the three carbohydrates can determine the proper feed ratios of fuel, steam and oxygen in addition to the best catalyst for optimizing $H_2$ selectivity.

Reactor

The autothermal reforming of volatile carbohydrates was examined in an 18 mm inner diameter quartz tube approximately 55 cm long as described Deluga and co-workers (G. A. Deluga, J. R. Salge, L. D. Schmidt, X. E. Verykios, *Science*, 303, 993 (2004); and U.S. Pat. No. 7,255,848). The liquid fuel, methanol (Mallinckrodt, >99%) or ethylene glycol (Fisher Scientific, >99%), with or without water was introduced at room temperature using an automotive fuel injector. The injector produced sufficiently small droplets that permitted rapid vaporization of the liquid fuel in air and on the reactor walls. The fuel was fed to the injector from a fuel tank that was pressurized at 30 psig with a $N_2$ blanket regulated from a gas cylinder. The fuel injector, operating at 10 Hz, was controlled using LabVIEW software by varying the duty cycle (the percentage of time that the injector remains open) between 2-10%. Fuel delivery exhibited linear behavior with duty cycle and was accurate to within ±2%. Glycerol (Alfa Aesar, >99%) and glycerol/water mixtures were pumped into the reactor by a syringe pump due to their high viscosity. All experiments were carried out at atmospheric pressure.

Air was supplied from a regulated gas cylinder at room temperature using a mass flow controller to an inlet 3 cm below the fuel injector. The mass flow controller was operated using LabVIEW software and accurate to within ±5%. To vaporize the fuel, the upper 25 cm of quartz tube was wrapped in heating tape controlled with a variac. A ceramic foam was wrapped in a ceramic cloth and inserted directly below the heating tape to ensure that the fuel-air mixture was sufficiently mixed. A chromel-alumel K-type thermocouple was inserted into the quartz reactor 2 cm below the mixing monolith to measure the preheated mixture temperature. Preheat temperatures were maintained at 90, 230, and 300° C.±10° C. for methanol, ethylene glycol, and glycerol respectively to assure a uniform vapor mixture.

Uncoated foams were placed upstream and downstream of the catalyst coated foam to reduce axial radiation losses from the operating catalysts. The three monoliths were wrapped in ceramic cloth to eliminate gas bypass and then inserted into the reactor approximately 5 cm below the preheat thermocouple. The downstream uncoated foam monolith had a hole approximately 2 mm in diameter bored with the reactor axis. A second K-type thermocouple was inserted through the bottom of the quartz tube and through the bottom uncoated foam to measure the back-face catalyst operating temperature. Alumina-silica insulation was placed around the reactor to minimize radial heat loss. Product gases were sampled approximately 5 cm (centimeter) below the bottom uncoated foam at the reactor outlet using a gas-tight syringe.

Catalyst Preparation

All catalysts were supported on 17 mm diameter ceramic (92% α-$Al_2O_3$, 8% $SiO_2$) foams. The supports were 10 mm in length with 80 pores per linear inch (ppi) of average channel diameter approximately 200 μm (micrometer). Foams had a nominal surface area of approximately 1.0 m²/g (meter²/gram) and a void fraction of approximately 80%. The foams were loaded by wet impregnation as described previously (J. R. Salge, G. A. Deluga, L. D. Schmidt, *J. Catal.*, 235, 69 (2005)).

Rhodium and platinum metals were coated on foams by the incipient wetness technique of metal salts ($Rh(NO_3)_3$, $H_2PtCl_6$) and subsequent drying in air. Dried catalysts were calcined at 600° C. for 6 hour in a closed furnace. Catalysts consisting of only one metal were 5.0±0.5% (approximately 0.10 g) of the mass of the foam monolith support. Two metal catalysts rhodium-lanthanum (RhLa) and rhodium-ceria (RhCe) were coated on foams by drop-wise addition of a mixture of aqueous solutions of metal salts ($Rh(NO_3)_3$, $Ce(NO_3)_3.6H_2O$, or $La(NO_3)_3.6H_2O$). A measured amount of solution resulted in approximately 2.5 wt % each of Rh and Ce or La. Dried catalysts were heated at 600° C. for 6 hour in a closed furnace.

A $\gamma$-$Al_2O_3$ washcoat was applied to some catalyst supports prior to metal loading to increase surface area and decrease channel size (A. S. Bodke, S. S. Bharadwaj, L. D. Schmidt, *J. Catal.*, 179, 138 (1998)). A 3 wt % slurry of $\gamma$-$Al_2O_3$ in distilled water was applied drop-wise to the foam and allowed to dry. Dried foams were then heated at 600° C. for 6 hour in a closed furnace. Washcoats were typically 5% by weight of the foam producing an average alumina film thickness of approximately 10 µm (micrometer). Rhodium and ceria were then loaded in the manner described above and this catalyst was referred to as rhodium-ceria-washcoat (RhCeWc).

Experimental runs were at least 10 hour on any given catalyst, and some catalysts were used for as long as 30 hours. Almost all experiments were repeated on several catalysts without significant difference or deactivation. All catalysts were heated to at least 700° C. multiple times during use.

Product Analysis

Gas samples of steady-state reactor products were collected through a septum at the exit oil the reactor. A gas-tight syringe wrapped in heating tape and controlled by a variac maintained an internal syringe wall temperature of approximately 125° C. Product samples collected through the septa were injected into a dual-column gas chromatograph (GC) equipped with thermal conductivity and flame ionization detectors. Column response factors and retention times were determined by injecting quantities of known species relative to $N_2$. Mass balances on carbon, and hydrogen typically closed within ±5%.

All product selectivities to any species were calculated on an atomic carbon basis, $S_C$(species), or an atomic hydrogen basis, $S_H$(species). Selectivity can be defined as the (atoms in the product species)/(atoms in the converted fuel). Fuel does not include water. Therefore, the 2 moles of $H_2$ contained in one mole of methanol represents $S_H(H_2)$=100% regardless of the amount of water added as a reactant. By this definition $S_H(H_2)$ can potentially exceed 100% if all of the H atoms from the fuel and some from the water are converted to $H_2$. All atomic selectivities based on the same element (C or H) sum to unity within experimental error.

Equilibrium concentrations were calculated at atmospheric pressure, the experimentally observed back-face catalyst temperature, and the reactant feed for each C/O and S/C ratio. The equilibrium selectivity to products has been included in all figures as dashed lines when capable of providing insight to the results. Allowed species include $N_2$, $H_2$, $O_2$, CO, $H_2O$, $CO_2$, $CH_4$, $C_2H_6$, $C_2H_4$, $C_2H_2$, $CH_4O$, $C_2H_4O$, $C_2H_6O$, and fuel. All equilibrium calculations were carried out using HSC software (Outokumpu Research Oy, "HSC Chemistry", Ver. 4.1, www.outokumpu.com/hsc).

Results

All experiments were at a constant molar flow rate of 4.0 standard liters per minute (SLPM). The reactant carbon-to-oxygen ratio (C/O) was defined as the moles of carbon in the fuel flow divided by the moles of atomic oxygen in the air flow. By this definition, complete combustion occurs at C/O=0.33, 0.40, and 0.43 for methanol, ethylene glycol, and glycerol, respectively. Experiments varied C/O at ratios higher than combustion stoichiometry in the oxygen deficient region to sufficiently examine a maximum in $H_2$ selectivity. The reactant steam-to-carbon ratio (S/C) was defined as the moles of water divided by the moles of atomic carbon in the carbohydrate feed. All data points represent the average of three measurements.

Effect of Catalyst

FIGS. 5A-F depict the catalytic partial oxidation of ethylene glycol on Rh and Pt based catalysts. Rh-based catalysts have shown high selectivity for synthesis gas from oxygenated compounds by autothermal reforming (E. C. Wanat, B. Suman, L. D. Schmidt, *J. Catal.* 235, 18 (2005), D. K. Liguras, D. I. Kondarides, X. E. Verykios, *Appl. Catal., B* 43, 345 (2003)). Alternatively, autothermal reforming of oxygenates on Pt catalysts have exhibited higher selectivity than Rh for intermediates such as ethylene and methane and lower selectivity for synthesis gas (J. R. Salge, G. A. Deluga, L. D. Schmidt, *J. Catal.*, 235, 69 (2005)). The two metals Ce and La were considered as Rh additives loaded at 2.5 wt % of the foam mass with 2.5 wt % Rh. The additive Ce provides an interesting comparison by increasing surface oxidations rates (H. Cordatos, T. Bunluesin, J. Stubenrauch, J. M. Vohs, R. J. Gorte, *J. Phys. Chem.*, 100, 785 (1996)). Catalysts containing Ce have exhibited enhanced water-gas-shift activity (C. Wheeler, A. Jhalani, E. J. Klein, S. Tummala, and L. D. Schmidt, *J. Catal.*, 223, 191 (2004)) in addition to resistance to coke accumulation (T. Zhu, M. F. Flytzani-Stephanopoulos, *Appl. Catal., A* 208, 403 (2001)). La has been investigated as a second additive for comparison.

Reforming of ethylene glycol exhibited steady operation over all experimental conditions. Transient behavior due to a change in operating conditions occurred for a maximum of 3 minutes. Upstream flames or oxygen breakthrough was not observed for any catalyst. Constant flow rate of 4.0 SLPM corresponded to a GHSV approximately $10^5$ $h^{-1}$, equivalent to a contact time of $\tau$ approximately 10 ms at 700° C. Conversion at these conditions was greater than 99% for all catalysts for C/O<1.6. Thereafter each catalyst exhibited a steady decrease in conversion with RhCe>Pt>RhLa>Rh. All catalysts cooled as the reactor feed became more oxygen deficient as expected. The three Rh catalysts (Rh, RhCe, RhLa) operated at about the same temperature with similar behavior. However the Pt back-face temperature was approximately 30° C. higher for C/O<1.6 and approximately 30° C. lower for C/O>1.6.

$H_2$ selectivity of the four unwashcoated catalysts exhibited a maximum similar to that observed with other oxygenated compounds (G. A. Deluga, J. R. Salge, L. D. Schmidt, X. F. Verykios, *Science*, 303, 993, (2004)). At C/O less than approximately 1.3, $H_2$ selectivity decreases as equilibrium $H_2$ selectivity decreases. Above C/O approximately 1.4, $H_2$ selectivity decreases as the process cools and slows down. The order of maximum $H_2$ selectivity was RhLa (55%)>RhCe (50%)>Rh (43%)>Pt (38%). Rh-based catalysts exhibited similar CO selectivity of approximately 75% at lower C/O ratios where a maximum in $H_2$ selectivity occurs. Pt produced 10-15% less CO than Rh-based catalysts. The remaining carbon resulted in $CO_2$ and the intermediates ethylene, methane, and acetaldehyde.

Ethylene selectivity was less than 2% for all Rh-based catalysts, but up to 5% for Pt. At a C/O=1.3, ethylene selectivity for RhCe and RhLa was negligible. Maxima were observed for RhCe (1.4%) and RhLa (1.1%) at C/O=1.9. Rh exhibited a maximum in ethylene selectivity of 1.6% at C/O=1.7. Similar behavior was observed in methane selectivity. Methane selectivity with Rh-based catalysts never exceeded 9%, while methane selectivity on Pt achieved a maximum of 17% at C/O=1.6. Acetaldehyde selectivity increased steadily with C/O, achieving a maximum of 15-20% on both Pt and Rh-based catalysts. At the maximum $H_2$ producing C/O=1.3, the minor products of ethylene, methane, and acetaldehyde do not sum to more than 3% on either RhCe or RhLa.

Effect of Washcoat

Included in FIGS. 5A-F is a comparison of the RhCe and RhCeWc catalyst whereby the sole experimental difference was a 5 wt % γ-alumina washcoat layer applied before catalyst preparation for RhCeWc. Washcoat reduces the backface temperature approximately 20° C. at low C/O ratios and approximately 100° C. at high C/O ratios. Negligible difference in conversion was observed. Washcoat increases $H_2$ selectivity from ethylene glycol by approximately 20%. Maximum $H_2$ selectivity of 69% occurs at C/O=1.5 with RhCeWc before deviation from equilibrium occurs at C/O>1.6. In contrast the effect of washcoat has a nearly negligible effect on CO selectivity.

Washcoat also significantly reduces the production of minor products ethylene, methane, and acetaldehyde. Ethylene was not observed from ethylene glycol with RhCeWc, while methane selectivity did not exceed 1%. Acetaldehyde ($C_2H_4O$) was not observed until C/O=1.6 at which $S_C(C_2H_4O)$ approximately 2%. At the maximum $H_2$ selectivity C/O ratio of 1.5, the selectivity of minor products do not sum to more than 1%. For these reasons, the RhCeWc catalyst system has been considered for the autothermal reforming of methanol, ethylene glycol, and glycerol with steam addition.

Autothermal Steam Reforming of Methanol

FIGS. 6A-D shows the temperature, conversion, and measured selectivities of the autothermal reforming of methanol on a 5 wt % RhCeWc catalyst at 4.0 SLPM. Data describing S/C=2 has been omitted for clarity but has been included in Table 1.

TABLE 1

Selected experimental data for the autothermal reforming of carbohydrates.

| Catalyst | Methanol | | | Ethylene Glycol | | | | Glycerol | | |
|---|---|---|---|---|---|---|---|---|---|---|
| | RhCeWc | RhCeWc | RhCeWc | Pt | RhCeWc | RhCeWc | RhCeWc | RhCeWc | RhCeWc | RhCeWc |
| Steam/Carbon | 0 | 2 | 4.5 | 0 | 0 | 2 | 4.5 | 0 | 2 | 4.5 |
| Carbon/Oxygen | 1.4 | 1.2 | 1.2 | 1.6 | 1.5 | 1.1 | 1.1 | 1.2 | 1.2 | 0.9 |
| Conversion (%) | 99 | 100 | 100 | 100 | 100 | 100 | 100 | 100 | 100 | 100 |
| Temperature (° C.) | 750 | 652 | 519 | 888 | 819 | 802 | 680 | 1055 | 825 | 862 |
| Hydrogen Sel. (%) | | | | | | | | | | |
| $H_2$ | 75 | 89 | 85 | 15 | 69 | 72 | 92 | 56 | 75 | 79 |
| $H_2O$ | 24 | 10 | 13 | 54 | 30 | 27 | 8 | 41 | 25 | 21 |
| Carbon Sel. (%) | | | | | | | | | | |
| CO | 74 | 29 | 36 | 61 | 76 | 62 | 27 | 79 | 58 | 27 |
| $CO_2$ | 24 | 70 | 63 | 10 | 23 | 37 | 73 | 19 | 42 | 73 |
| $CH_4$ | 1 | 0.8 | 1.4 | 17 | 0.6 | 1 | 0.2 | 1.1 | 0.1 | — |
| $C_2H_4$ | — | — | — | 5 | — | — | — | 0.7 | — | — |
| $C_2H_4O$ | — | — | — | 5 | 0.2 | — | — | — | — | 0.1 |
| $H_2/CO$ | 2.0 | 6.1 | 4.7 | 0.4 | 1.4 | 1.7 | 5.1 | 0.9 | 1.7 | 3.9 |

Experiments were carried out at 4.0 standard liters per minute at atmospheric pressure. RhCeWc catalysts consisted of 2.5 wt % Rh and 2.5wt % Ce on a 5 wt % γ-$Al_2O_3$ washcoat supported on 80 ppi α-$Al_2O_3$ monoliths. Pt catalysts consisted of 5 wt % Pt supported on 80 ppi α-$Al_2O_3$ monoliths. Selectivity was defined as (C or H atoms in product)/(C or H atoms in converted fuel). Selected RhCeWc data points exhibited a maximum $H_2$ selectivity.

The back-face temperatures show the dramatic range approximately 400-1100° C. at which methanol reforms by varying C/O and S/C. Steam addition to S/C=4.5 lowers the back-face temperature by approximately 250° C. but maintains steady autothermal reforming with negligible effect on conversion. Conversion at both S/C ratios was >95% for all C/O ratios.

The relatively low temperatures of the autothermal reforming of methanol at high C/O ratios significantly affects the reaction equilibrium. Significant methanation of the S/C=0 trial occurs at C/O=1.5 and above producing a maximum $H_2$ equilibrium selectivity. This maximum occurs at a lower C/O=1.1 for the S/C=4.5 trial resulting in a severe reduction in the potential for $H_2$ production thereafter. $H_2$ selectivity achieves a maximum of 75% for the S/C=0 trial at C/O=1.4 and departs from equilibrium at higher C/O ratios. $H_2$ selectivity of the S/C=4.5 trial exhibits the behavior predicted by equilibrium producing a maximum of 85% at C/O=1.2. The remaining hydrogen exited as the products $CH_4$ and $H_2O$.

Observed CO selectivity was always greater than that predicted by equilibrium supporting the conclusion that CO is a major intermediate and product. The addition of steam to S/C=4.5 lowers the CO equilibrium selectivity by approximately 60%. However the S/C=4.5 trial was only capable of achieving CO equilibrium at C/O=0.7. Similarly the selectivity for $CH_4$ in the S/C=4.5 trial only achieved equilibrium at C/O approximately 0.9 and below. The sum of carbon selectivity ($S_C$) of all products equals unity within experimental error with the inclusion of $CO_2$ (not shown). The addition of steam therefore results in less $CO_2$ and $CH_4$ and more CO and $H_2O$ than predicted by equilibrium.

Autothermal Steam Reforming of Ethylene Glycol

FIGS. 7A-F show the temperature, conversion, and measured product selectivities of the autothermal reforming of ethylene glycol on a 5 wt % RhCeWc catalyst at 4.0 SLPM. Data describing S/C=2 has been omitted for clarity but has been included in Table 1. The addition of steam at S/C=4.5 lowers the operating catalyst back-face temperature approximately 250° C. The reduction in temperature through steam addition had a negligible effect on conversion of ethylene glycol. Conversion greater than 99% was observed for all C/O ratios less than 1.6 encompassing the operating parameters that maximize $H_2$ production.

Ethylene glycol reforms approximately 150° C. warmer than methanol for almost all C/O ratios consistent with a preheat temperature difference of 140±10° C. The slightly higher operating temperature prevents significant methanation with the S/C=4.5 trial until C/O=1.4. The onset of methanation restricts the maximum $H_2$ equilibrium selectivity to approximately 110% at C/O=1.4. The observed process only achieved $S_H(H_2)$=92% at C/O=1.1, and higher C/O ratios resulted in 1-12 selectivities significantly less than equilibrium. The addition of steam to S/C=4.5 thus raised the $H_2$ selectivity approximately 30%. The sum of the hydrogen selectivity of all species equaled unity within experimental error with the inclusion of $H_2O$ (not shown).

The observed selectivity to CO in the S/C=0 trial achieved equilibrium of approximately 75% for all C/O ratios. The addition of steam to S/C=4.5 significantly lowered equilibrium selectivity of CO to less than 20%. However, observed CO selectivity never achieved equilibrium with a minimum of only $S_C(CO)$=27% at C/O=1.1. Minor products observed in the reactor effluent included methane, acetaldehyde, and trace amounts of ethane and ethylene. Acetaldehyde was not predicted at any significant amount by equilibrium at any C/O and was only observed in trace amounts at the C/O ratio of maximum $H_2$ selectivity for all S/C. Methane was not observed at $S_C(CH_4)$>1% for any C/O despite equilibrium exceeding 10% at C/O>1.5 for the S/C=4.5 trial.

Autothermal Steam Reforming of Glycerol

FIGS. 8A-F show the temperature, conversion, and measured product selectivities of the autothermal reforming of glycerol on a 5 wt % RhCeWc catalyst at 4.0 SLPM. Data describing S/C=2 has been omitted for clarity but has been included in Table 1. CPOx of glycerol operates with a catalyst back-face temperature of approximately 900-1200° C. for 1.0<C/O<1.6. Operating temperatures are approximately 100° C. warmer than observed with ethylene glycol consistent with a preheat temperature 70±10° C. warmer. The addition of steam at S/C=4.5 lowers the back-face temperature approximately 300° C. Similar to methanol and ethylene glycol, the change in operating temperature resulted in negligible differences in glycerol conversion. Conversions greater than 99% were observed for all C/O and S/C ratios. Steady autothermal reforming was observed at all operating parameters without significant carbon accumulation.

Autothermal reforming of glycerol at S/C=0 achieved equilibrium $H_2$ selectivity for all C/O ratios below 1.3 with a maximum of 56% at C/O=1.2. The addition of steam at S/C=4.5 significantly increases the equilibrium $H_2$ selectivity 30-40% such that $S_H(H_2)$=115% for C/O=1.6 at equilibrium conditions. However, the observed $H_2$ selectivity from glycerol departs from equilibrium for C/O>1.0 producing a maximum of $S_H(H_2)$=79% at C/O=0.9. Data points exceeding equilibrium were within experimental error.

The selectivity to CO was above equilibrium and equal to approximately 80% for all C/O ratios of the S/C=0 experiments. The addition of steam lowered the CO equilibrium selectivity approximately 50% over the entire C/O range. However, the observed CO selectivity of the S/C=4.5 experiment departed from equilibrium significantly for C/O>1.0 producing a minimum $S_C(CO)$=25% at C/O=0.9. The remaining carbon from the reactant fuel was reformed to $CO_2$ and the minor products methane, acetaldehyde, ethane, and ethylene. Only trace amounts of ethane and ethylene were observed. Acetaldehyde was not predicted by equilibrium but was observed as high as $S_C$=8% at C/O=1.5 for the S/C=4.5 experiment. However, at operating parameters producing maxima in $H_2$ selectivity, $S_C$<0.1% of acetaldehyde was observed. Methane was measured at a maximum of $S_C(CH_4)$=2% at C/O=1.6, while equilibrium predicts at most $S_C(CH_4)$=0.5%.

Discussion

The results show that reforming of carbohydrates by autothermal steam reforming can produce high selectivity to synthesis gas while all minor products exhibited selectivity no more than $S_C$ approximately 2% under optimum conditions. Examination of the overall reforming process as well as the surface chemistry of carbohydrates shows that the routes for synthesis gas are favorable while routes for undesirable products are not.

Millisecond Contact Time Reactor Zones

The general model of catalytic partial oxidation of fuels in millisecond contact time reactors involves two distinct reforming zones. Premixed gases entering the catalyst at high velocity and low temperature undergo surface reactions that rapidly raise the operating temperature in less than a millisecond. Experimental spatial profiles within the catalyst with resolution less than a millimeter have shown that this oxidation zone exists for the first 1-2 mm (millimeter) during which more than 99% of $O_2$ is consumed (R. Horn, K. A. Williams, N. J. Degenstein, L. D. Schmidt, *J. Catal.*, 242, 92 (2006)).

Surface reactions in this zone likely form much of the thermodynamic products $H_2$, $H_2O$, CO, $CO_2$, and $CH_4$ directly from a large fraction of the reactant fuel and $O_2$.

At low C/O ratios, most of the fuel can be converted in the oxidation zone. However, as C/O increases more of the fuel exists past this zone into the remaining 8-9 mm (millimeter) of catalyst deficient of $O_2$. Detailed modeling has shown that a fraction of the surface sites in this region of the catalyst are covered by adsorbed carbon (O. Deutschmann, L. D. Schmidt, *AIChE J.*, 44, 2465 (1998)). Under these conditions homogeneous chemistry can become significant, producing non-equilibrium products. Endothermic reforming reactions between unreacted fuel and oxidation products lower the gas phase temperature from the maximum in the oxidation zone. Spatial profiles have shown that the gas phase temperature observed at the catalyst back-face can be 100-150° C. lower than the maximum temperature (R. Horn, K. A. Williams, N. J. Degenstein, L. D. Schmidt, *J. Catal.*, 242, 92 (2006)). The observed non-equilibrium products are thus affected by both the chemistry specific to the considered fuel as well as the temperature.

Mechanisms

Adsorption and decomposition of methanol and ethylene glycol has been studied extensively on noble metal surfaces (M. P. Zum Mallen, L. D. Schmidt, *J. Catal.*, 161, 230 (1996), N. F. Brown, M. A. Barteau, *J. Phys. Chem.*, 98, 12737 (1994)). For example, adsorption of methanol has been examined on both Rh(111) (C. Houtman, M. A. Barteau, *Langmuir*, 6, 1558 (1990)) and polycrystalline surfaces (M. P. Zum Mallen, L. D. Schmidt, *J. Catal.*, 161, 230 (1996)). At the high temperature of the oxidation zone (800-1000° C.), the catalytic Rh surface is likely clean with most catalytic sites available (A. B. Mhadeshwar, D. G. Vlachos, *J. Phys. Chem.*, B 109, 16819 (2005), C. T. Williams, C. G. Takoudis, M. J. Weaver, *J. Phys. Chem.*, B 102, 406 (1998)). Oxygenated compounds containing hydroxyl groups have been shown to adsorb to these open sites predominately through one or more oxygen atoms. Subsequent decomposition breaking O—H, C—H, C—O, and possibly C—C bonds produces adsorbed H, C, O, or CO, which can then reform to synthesis gas.

Adsorption of methanol has been shown to occur with one active site through an electron pair on the hydroxyl group (A. B. Mhadeshwar, D. G. Vlachos, *J. Phys. Chem., B* 109, 16819 (2005)). Thereafter, decomposition has been shown in ultra-high vacuum to occur initially through removal of the hydroxyl hydrogen producing adsorbed methoxide and adsorbed atomic H(C. Houtman, M. A. Barteau, *Langmuir*, 6, 1558 (1990)). Subsequent C—H bond scissions rapidly produce formaldehyde and formyl intermediates and eventually adsorbed CO. Carbon monoxide has been shown to remain essentially nondissociative (M. P. Zum Mallen, L. D. Schmidt, *J. Catal.*, 161, 230 (1996)). A key observation of this mechanism can be that once methanol adsorbs, it goes to synthesis gas without the possibility of producing methane or some larger product through dimerization. This agrees with the observed results that CO and $H_2$ dominate even at high C/O ratios.

Adsorption and decomposition of ethylene glycol occurs similar to methanol with the added complexity of a C—C bond and a second hydroxyl group. Ethylene glycol adsorption on Rh(111) likely occurs through both oxygen atoms (N. F. Brown, M. A. Barteau, *J. Phys. Chem.*, 98, 12737 (1994)). Decomposition occurs initially with O—H scission producing a dioxy intermediate, which can continue to decompose with C—C or C—H scission. The C—O bond was not observed to break, thereby preventing appreciable quantities of products other than CO and $H_2$ (N. F. Brown, M. A. Barteau, *J. Phys. Chem.*, 98, 12737 (1994)). This can be consistent with the high selectivity to synthesis gas products observed experimentally at high C/O ratios. The structure of glycerol is similar to ethylene glycol, making it likely that its fastest decomposition route can be similar to that described above.

Acetaldehyde could be produced homogeneously as an intermediate by the dehydration of ethylene glycol and subsequent rearrangement. This intermediate could further adsorb and decompose, making its surface mechanism a possible step. Examination of acetaldehyde on Rh(111) has shown that its adsorption and decomposition are notably different than the carbohydrates (C. J. Houtman, M. A. Barteau, *J. Catal.*, 130, 528 (1991)). Acetaldehyde adsorbs to two adjacent Rh sites through C and O as $\eta^2(C,O)$-acetaldehyde. Scission of the adsorbed carbon C—H bond produces the $\eta^1(C)$-acyl. This species can break the C—C bond producing CO and methyl eventually desorbing as methane. This mechanism can be consistent with the appearance of methane and acetaldehyde in FIGS. 5A-F. Acetaldehyde shows minimal dependence on catalyst, suggesting that it can be a homogeneous product. Then at higher C/O ratios, methane selectivity decreases as acetaldehyde increases, making it likely that some of the methane can be produced from acetaldehyde decarbonylation.

Effect of Catalyst

FIGS. 5A-F show that catalyst selection significantly affects selectivity to synthesis gas and the non-equilibrium products ethylene and methane. The addition of Ce or La to Rh raised the synthesis gas selectivity approximately 10%. A possible explanation can be the ability of Ce to store oxygen making it available for surface reactions on Rh (H. Cordatos, T. Bunluesin, J. Stubenrauch, J. M. Vohs, R. J. Gorte, *J. Phys. Chem.*, 100, 785 (1996), M. E. Dry, *Appl. Catal., A* 138, 319 (1996)). This could result in faster chemistry, likely increasing the overall rate of partial oxidation. In comparison, Pt produced less $H_2$ than Rh at higher C/O ratios. Analysis of the adsorption of methanol on polycrystalline Pt surfaces has shown that decomposition can be dominated by the breaking of the C—O bond (M. P. Zum Mallen, L. D. Schmidt, *J. Catal.*, 161, 230 (1996)). C—O bond scission could result in increased levels of adsorbed carbon, fewer available catalytic sites, and an overall slower rate of partial oxidation.

Effect of Washcoat

Addition of a 5 wt % $\gamma$-$Al_2O_3$ washcoat layer to the support before loading the RhCe catalyst was shown to significantly increase selectivity to $H_2$ and suppress production of non-equilibrium products. Washcoat layers have been found to roughen the support surface, decrease channel size, and increase surface area, thereby increasing mass transfer (A. S. Bodke, S. S. Bharadwaj, L. D. Schmidt, *J. Catal.*, 179, 138 (1998)). Therefore, the lower selectivity to non-equilibrium products from the washcoated catalyst can be likely due to the catalysts ability to transfer these products to the surface and reform them completely to synthesis gas.

Autothermal Steam Reforming of Carbohydrates

Table 1 summarizes the autothermal reforming of all three carbohydrates at all considered S/C ratios that maximize selectivity to $H_2$ on RhCeWc catalysts. All three carbohydrates are capable of millisecond reforming, achieving equilibrium at low C/O. Conversion of carbohydrates was high relative to less oxygenated products under similar operating conditions (J. R. Salge, G. A. Deluga, L. D. Schmidt, *J. Catal.*, 235, 69 (2005)). Additionally, at high C/O, the conversion decreased as the size of the carbohydrate decreased. The methanol sticking coefficient on Rh as 0.29 which is approximately 25% higher than 0.23 reported for dissociative adsorption of methane on two Rh catalytic sites (A. B. Mhadeshwar, D. G. Vlachos, *J. Phys. Chem*., B 109, 16819 (2005). The combination of multiple hydroxyl groups adsorbing on multiple Rh sites probably reduces the possibility that an adsorbed carbohydrate could desorb as an unconverted product.

The addition of steam to all three carbohydrates raised the selectivity to $H_2$ and $CO_2$ and lowered the selectivity to $H_2O$ and CO. Steam addition at higher S/C ratios raised the equilibrium selectivity to $H_2$ while lowering the overall operating temperature. Therefore, the maximum selectivity to $H_2$ occurred at lower C/O as S/C increased in a trend for all three carbohydrates visible in Table 1. Reforming that occurred at these optimized parameters exhibited only minor loss of useable energy. For example, conversion of methanol at S/C=0 and C/O=1.4 produced an effluent product with approximately 85% of the availability of the gaseous carbohydrate feed stream. The addition of steam also permitted a tunable synthesis gas ratio ($H_2$/CO) calculated in Table 1. Maxima in $H_2$ selectivity exhibited a synthesis gas ratio range of approximately 1<$H_2$/CO<approximately 5 including the Fischer-Tropsch optimum of $H_2$/CO approximately 2 for the production of non-oxygenated fuels (M. E. Dry, *Appl. Catal., A* 138, 319 (1996)). Note again in Table 1 that minor products such as $CH_4$, ethylene, and acetaldehyde comprise a negligible fraction of the reactor effluent at the reactor conditions optimal for maximum $H_2$ selectivity.

CONCLUSION

The volatile carbohydrates methanol, ethylene glycol, and glycerol were reformed to synthesis gas under autothermal and fast (approximately 10 ms) conditions on noble metal catalysts. High selectivities to $H_2$ were achieved by adjusting the fuel/air and fuel/steam feed ratios as well as the catalyst. The addition of steam significantly suppressed CO selectivity while increasing selectivity to $H_2$ to as high as 92% near equilibrium. Rhodium catalysts with ceria supported on a $\gamma$-$Al_2O_3$ washcoat layer exhibited the best combination of high fuel conversion and $H_2$ selectivity. Under optimal operating parameters, total selectivity to all minor products was less than 2%.

For the conditions used in these experiments, surface reactions appear to dominate. Adsorption of all hydroxyl-containing compounds was interpreted as bonding on noble metal surfaces as an alkoxide species that completely decomposes to $H_2$ and $C_1$ products. The lack of significant routes to minor products by surface reactions as well as conversion at sufficiently fast rates makes it likely that larger carbohydrates such as glucose, starch, and cellulose are reformable to synthesis gas.

Example 6

Reactive Flash Volatilization of Glycerol Formulations

This example describes the conversion of liquid glycerol or liquid glycerol/water solutions to synthesis gas by direct application of liquid drops to the surface of a catalytic bed in the presence of co-fed oxygen gas. This process, called 'reactive flash volatilization,' permits steady-state, autothermal reforming of fluids directly to synthesis gas on millisecond time-scales without the addition of an external heat source.

Figure 10:
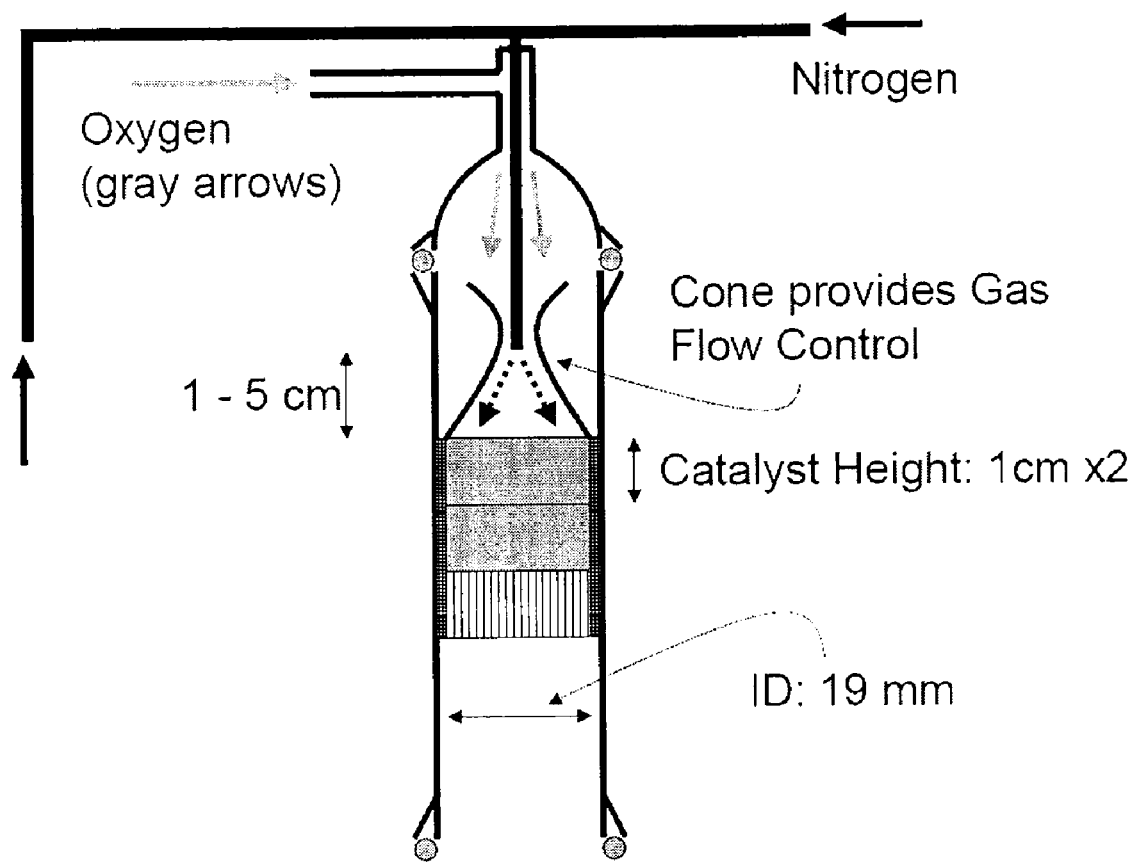
FIG. 10 illustrates an experimental setup for the reactive flash volatilization of glycerol using a Rh—Ce/$Al_2O_3$ catalyst within a quartz reactor.

The design used in this example makes use of one of many possible configurations involving a nebulizer instead of a fuel injector. The nebulizer is an entrained flow SS-50 type available from Burgener Research, Inc. Glycerol is introduced to the reactor in the form of a fine cloud or mist driven by nitrogen gas at between 30 psi and 80 psi which is used to agitate small liquid droplets of glycerol at the tip of the nebulizer. The glycerol is fed by a syringe pump. Oxygen gas flows around the nebulizer from a port upstream of the reactor.

Other configurations could allow for sheath flow, oxygen mixing the fuel, or non-gas driven nebulizers. In such configurations, the distance between the nebulizer and the catalyst is varied between 1 cm and 5 cm to maximize the distance between the two in order to achieve a developed spray that can cover the surface of the catalyst without depositing liquid droplets on the reactor wall and in order to avoid flashing the fuel/oxygen mixture upstream of the catalyst. Other equivalent reactors can include a bevel or a conical sheath to inhibit convection of the glycerol aerosol that can otherwise reach above the nebulizer tip. The entire reactor system can be wrapped in insulation.

All reactants including glycerol and water are introduced to the reactor at room temperature. No process heat is required to vaporize the fuel. Glycerol impinges on the catalyst front surface, creating a visible dark spot where particles begin to thermalize and oxidize. Two catalytic foams loaded with rhodium-cerium, as in the processes described in the examples above, are enough to convert 100% of the glycerol, depicted in FIG. 11. The catalytic bed is thus 2 cm deep. Total contact time is approximately 30 ms. Major products are CO, $H_2$, $H_2O$, and $CO_2$. FIGS. 12-15 illustrate the selectivity to these products.

In this experiment, water was also mixed with glycerol to demonstrate the thermal conservation of the reactor setup. Different molecular ratios of glycerol to water were considered between steam-to-carbon ratios of $0 \leqq S/C \leqq 1.66$. Mass balances closed for C and H at all points depicted within experimental error. Autothermal temperatures are shown, and all energy to vaporize the exit steam and other products is derived from the fuel.

Effluent measurements are made just below the catalyst using a gastight syringe using the methods described above.

Experimental Results

The reactive flash volatilization of liquid glycerol and liquid glycerol/water solutions exhibited steady, autothermal behavior over a range of C/O and S/C to a synthesis gas-rich effluent devoid of $C_2$ products. As shown in FIG. 11, complete conversion to C products was observed provided the autothermally observed temperature 20 mm in catalyst fixed bed depth was greater than ~600° C. For C/O and S/C which resulted in lower temperatures, $C_2$ products were observed.

Under the restricted conditions which produce only C1 products, high selectivity to $H_2$ and CO was possible as shown in FIGS. 12 and 14. At S/C=0, selectivity to $H_2$ was ~60%, and selectivity to CO was ~60% as limited by equilibrium. As S/C increases, the selectivity to $H_2$ increases, and the selectivity to CO decreases. As such, at S/C=0.66, the selectivity to $H_2$ achieved 95%. For all experiments, the remaining atomic C and H were converted to $CO_2$ and $H_2O$ as illustrated in FIGS. 13 and 15.

Experimental Data

FIG. 9 illustrates an experimental setup for the reactive flash volatilization of glycerol using a Rh—Ce/$Al_2O_3$ catalyst within a quartz reactor. Liquid glycerol was pumped through a nebulizer in the presence of oxygen and nitrogen such that fluid drops of fuel are applied directly to a hot catalyst surface. Autothermal, steady-state operation occurs producing a synthesis gas rich effluent on millisecond time-scales.

FIG. 10 illustrates an experimental setup for the reactive flash volatilization of glycerol using a Rh—Ce/Al$_2$O$_3$ catalyst within a quartz reactor. Liquid glycerol was pumped through a nebulizer in the presence of oxygen and nitrogen such that fluid drops of fuel are applied directly to a hot catalyst surface. Autothermal, steady-state operation occurs producing a synthesis gas rich effluent on millisecond time-scales. The addition of a ceramic cone controls the fluid flow pattern at the top of the reactor and reduces gaseous eddies permitting more accurate delivery of fuel drops to the catalyst.

Figure 11:
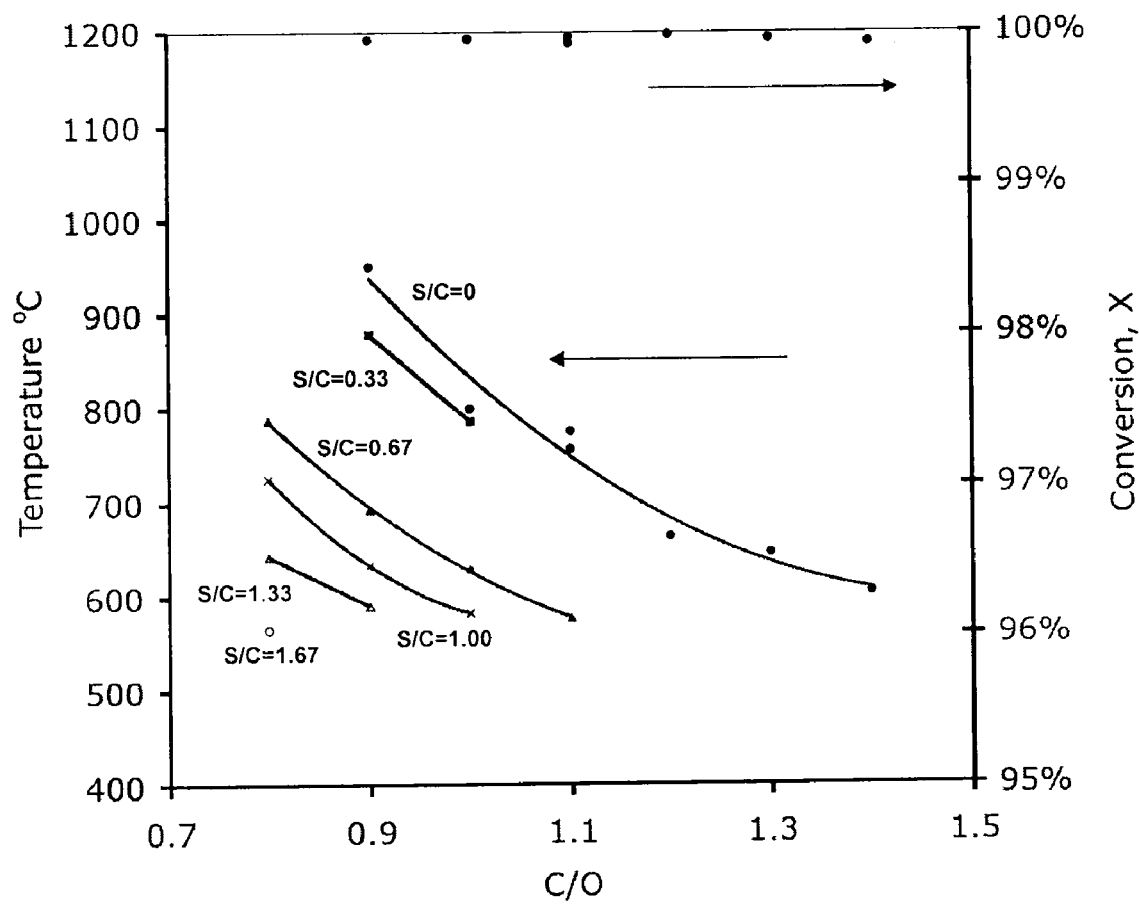
FIG. 11 illustrates the conversion and temperature measured at 20 mm depth of the catalytic bed in the reactive flash volatilization of glycerol, examined by varying the C/O ratio and steam/carbon (S/C) molar ratio.
Figure 12:
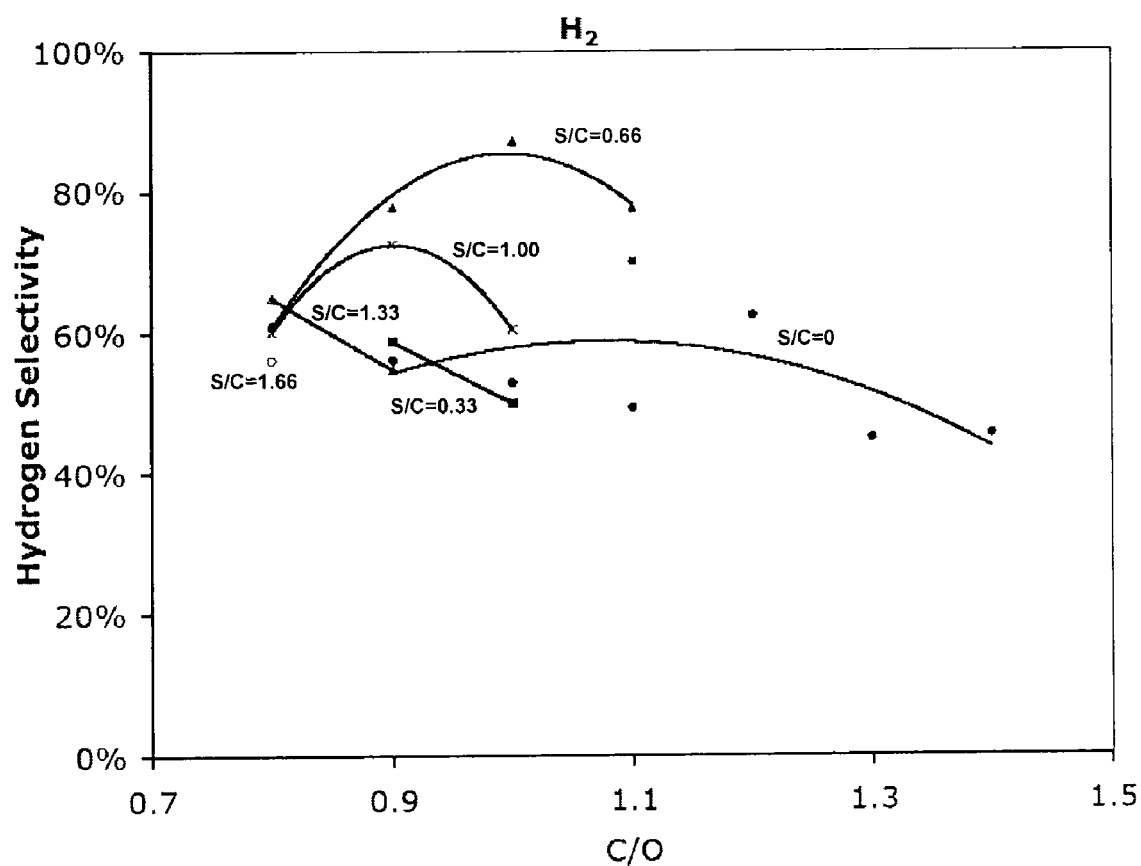
FIG. 12 illustrates the selectivity to $H_2$ observed in the gaseous products from the reactive flash volatilization of glycerol, examined by varying the C/O ratio and steam/carbon (S/C) molar ratio.

FIG. 11 illustrates the conversion and temperature measured at 20 mm depth of the catalytic bed in the reactive flash volatilization of glycerol, examined by varying the C/O ratio and steam/carbon (S/C) molar ratio. FIG. 12 illustrates the selectivity to H$_2$ observed in the gaseous products from the reactive flash volatilization of glycerol, examined by varying the C/O ratio and steam/carbon (S/C) molar ratio.

Figure 13:
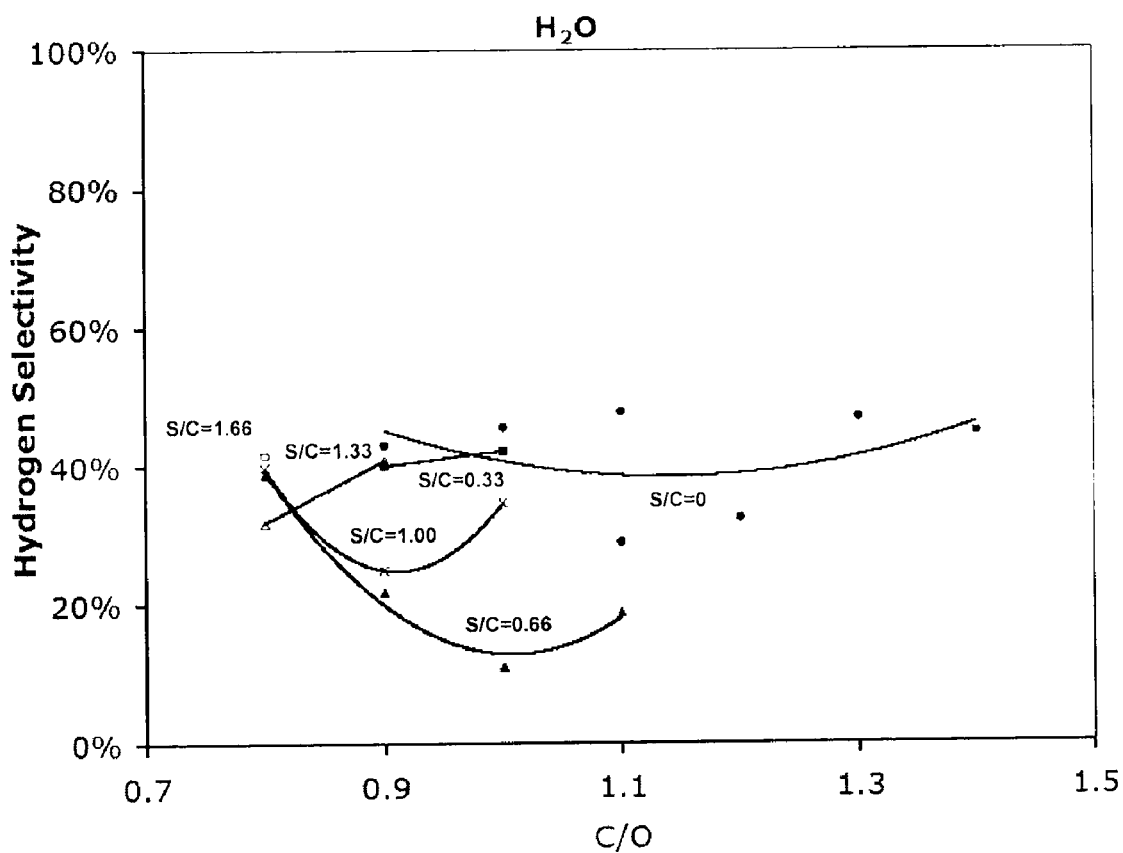
FIG. 13 illustrates the selectivity to $H_2O$ observed in the gaseous products from the reactive flash volatilization of glycerol, examined by varying the C/O ratio and steam/carbon (S/C) molar ratio.
Figure 14:
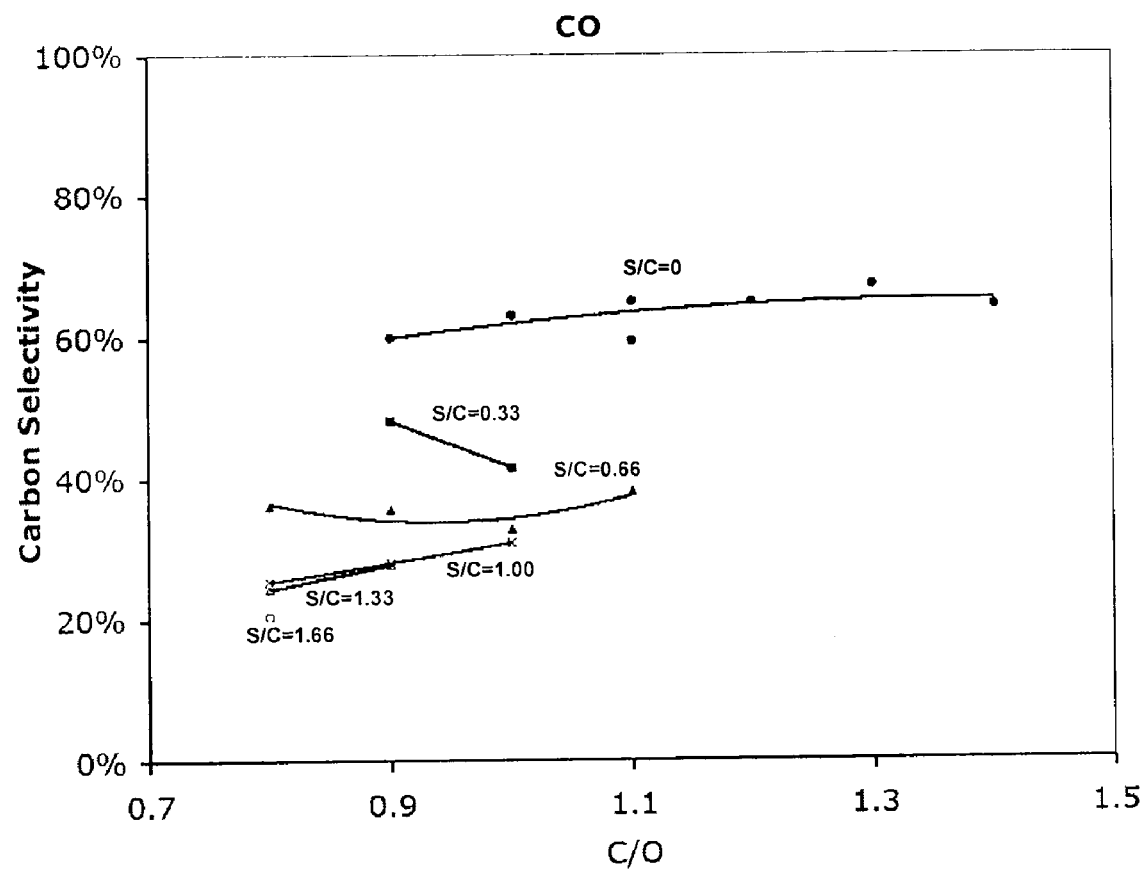
FIG. 14 illustrates the selectivity to CO observed in the gaseous products from the reactive flash volatilization of glycerol, examined by varying the C/O ratio and steam/carbon (S/C) molar ratio.
Figure 15:
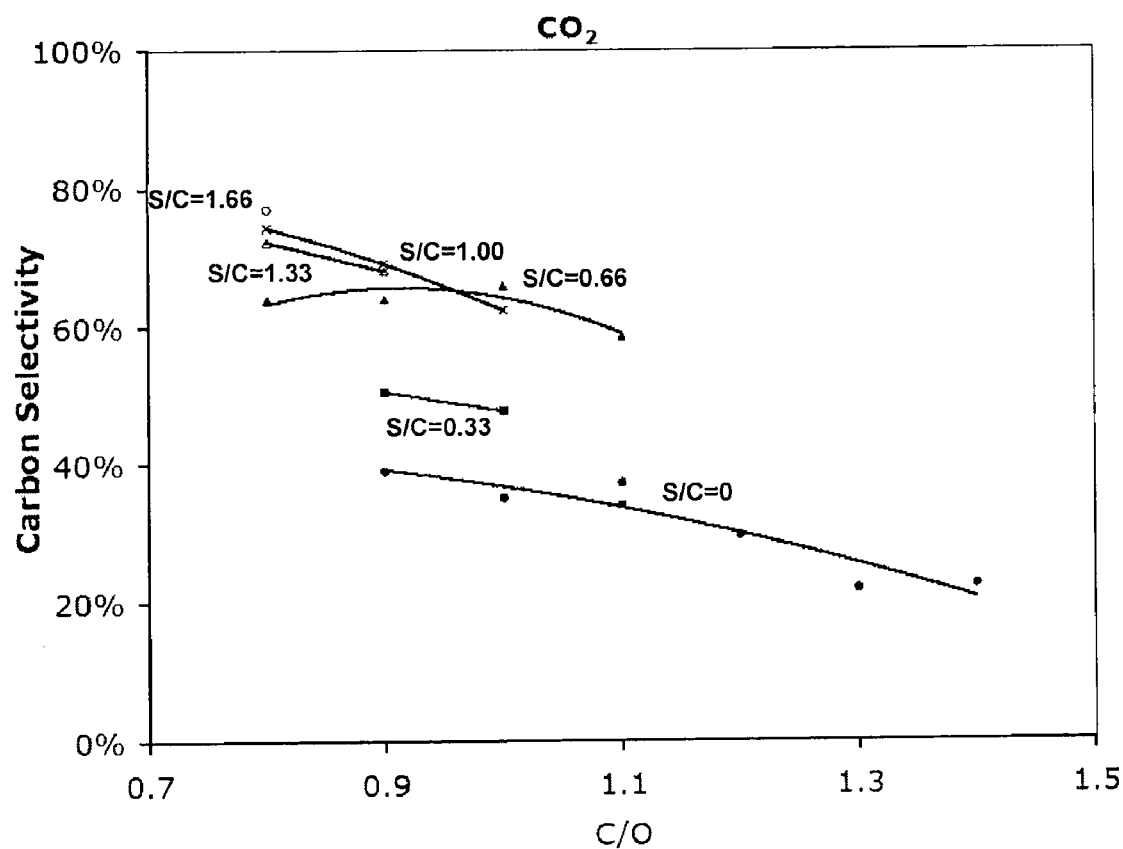
FIG. 15 illustrates the selectivity to $CO_2$ observed in the gaseous products from the reactive flash volatilization of glycerol, examined by varying the C/O ratio and steam/carbon (S/C) molar ratio.

FIG. 13 illustrates the selectivity to H$_2$O observed in the gaseous products from the reactive flash volatilization of glycerol, examined by varying the C/O ratio and steam/carbon (S/C) molar ratio. FIG. 14 illustrates the selectivity to CO observed in the gaseous products from the reactive flash volatilization of glycerol, examined by varying the C/O ratio and steam/carbon (S/C) molar ratio. FIG. 15 illustrates the selectivity to CO$_2$ observed in the gaseous products from the reactive flash volatilization of glycerol, examined by varying the C/O ratio and steam/carbon (S/C) molar ratio.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method to convert a liquid organic fuel into gasses comprising directly contacting the liquid organic fuel and a surface that comprises a rhodium-cerium catalyst in the presence of oxygen gas;
    wherein the gasses comprise molecular hydrogen and carbon monoxide;
    the rhodium-cerium catalyst is maintained at about 400° C. to about 1600° C.;
    the liquid organic fuel comprises carbon and oxygen, and the carbon/oxygen ratio of the fuel is about 0.1 to about 20.0; and
    the contacting occurs optionally in the additional presence of a C$_1$-C$_3$ hydrocarbon gas, water, an organic solvent, an inert gas, or a combination thereof;
    to provide the molecular hydrogen and the carbon monoxide; and
    wherein the liquid organic fuel comprises a liquid solution comprising starch, cellulose, hemicellulose, lignin, monosaccharides, disaccharides, or a combination thereof, or soybean oil, glycerol, or a C$_8$-C$_{18}$ fatty acid or ester thereof; and
    wherein the liquid organic fuel is directly impinged onto the rhodium-cerium catalyst by spraying, to produce small droplets or an aerosol, and the spraying is carried out by use of a fuel injector, pressurized nozzle, fogger, or nebulizer.

2. The method of claim 1 wherein temperatures above 800° C. are maintained to prevent deactivating carbon layers from forming in an amount capable of preventing the production of hydrogen gas and carbon monoxide gas.

3. The method of claim 1 wherein a deactivating carbon layer forms, further comprising volatilizing the deactivating carbon layer by contacting the fuel system and the rhodium-cerium catalyst surface with the C$_1$-C$_3$ hydrocarbon gas, water, an organic solvent, or by increasing the oxygen feed, or a combination thereof, and optionally increasing the temperature of the catalyst.

4. The method of claim 1 wherein the liquid organic fuel is impinged onto the rhodium-cerium catalyst by spraying, and reactive flash volatilization is carried out for about 0.1 millisecond to about 100 milliseconds.

5. The method of claim 1 wherein the rhodium-cerium catalyst further comprises Ni, Pd, Pt, Co, Ir, Fe, Ru, Os, Cu, Ag, Au, Re, or a combination thereof, and optionally comprises lanthanum.

6. The method of claim 1 wherein the rhodium-cerium catalyst further comprises lanthanum.

7. The method of claim 1 wherein contacting the rhodium-cerium catalyst surface occurs in the presence of reactant gases comprising 0.1-100 mole percent oxygen.

8. The method of claim 1 wherein the rhodium-cerium catalyst is preheated to at least about 300° C. prior to the introduction of the liquid organic fuel, wherein the preheating is carried out by spark ignition, addition of a C$_1$-C$_3$ hydrocarbon gas, alcohol, or solvent that comprises oxygen, by external heating, or a combination thereof.

9. The method of claim 1 wherein the total residence time of the reactants is between about 0.1 milliseconds and about 500 milliseconds.

10. The method of claim 1 wherein the reactant liquid organic fuel and oxygen gas are contacted at room temperature and the temperature of the rhodium-cerium catalyst is maintained via the reaction process.

11. The method of claim 1 wherein the rhodium-cerium catalyst is supported by a ceramic or metal support, the ceramic optionally comprises alumina, silica, zirconia, or ceria, and the support is in the form of pellets, spheres, grains, mesh, gauze, or foam.

12. The method of claim 1 wherein the liquid organic fuel is contacted to the rhodium-cerium catalyst in conjunction with steam or water, to provide a steam-to-carbon ratio of zero to about five.

13. A method comprising directly contacting a carbon and hydrogen-containing liquid organic fuel onto a rhodium-cerium catalyst in the presence of oxygen to produce hydrogen gas and carbon monoxide, wherein the contacting occurs at a temperature above 800° C. to prevent char formation in an amount capable of stopping production of the hydrogen gas and the carbon monoxide gas.

* * * * *

UNITED STATES PATENT AND TRADEMARK OFFICE
CERTIFICATE OF CORRECTION

PATENT NO. : 8,349,289 B2  
APPLICATION NO. : 12/043030  
DATED : January 8, 2013  
INVENTOR(S) : Schmidt et al.

Page 1 of 2

It is certified that error appears in the above-identified patent and that said Letters Patent is hereby corrected as shown below:

On the Title page, in column 2, under "(75) Inventors", line 5, after "(US)", insert --; David Rennard, Minneapolis, MN (US)--, therefor On Title page 2, in column 2, under "Other Publications", line 11, delete "2006 ," and insert --(2006),--, therefor On Title page 2, in column 2, under "Other Publications", line 12, delete "U.S. Appl." and insert --Serial--, therefor In the Specifications:

In column 1, line 14-15, delete "Numbers DE-FG02-88ER13878 and DE-FG02-88ERB878" and insert --Number DE-FG02-88ER13878--, therefor In column 4, line 24, delete "embodiment" and insert --embodiment,--, therefor In column 6, line 37, delete "(O0)" and insert --(O)--, therefor In column 16, line 15, delete "314." and insert --314,--, therefor In column 16, line 16, delete "reference" and insert --reference,--, therefor In column 16, line 61, delete "Ce(NO$_3$)$_3$.6H$_2$O" and insert --Ce(NO$_3$)$_3$·6H$_2$O--, therefor In column 19, line 36, delete "$\Delta H'$" and insert --$\Delta H°$--, therefor In column 19, line 61, delete "Fuels." and insert --Fuels,--, therefor Signed and Sealed this  
Second Day of July, 2013

Teresa Stanek Rea  
*Acting Director of the United States Patent and Trademark Office*

CERTIFICATE OF CORRECTION (continued)
U.S. Pat. No. 8,349,289 B2

In column 21, line 7, delete "$Ce(NO_3)_3.6H_2O$" and insert --$Ce(NO_3)_3 \cdot 6H_2O$--, therefor In column 21, line 7, delete "$La(NO_3)_3.6H_2O$" and insert --$La(NO_3)_3 \cdot 6H_2O$--, therefor In column 21, line 29, delete "oil" and insert --of--, therefor In column 22, line 51, delete "X. F." and insert --X. E.--, therefor In column 25, line 51, delete "1-12" and insert --H2--, therefor In column 26, line 66, delete "Hom" and insert --Horn--, therefor In column 27, line 10, delete "AlChE" and insert --AIChE--, therefor In column 27, line 47, delete "H(C." and insert --H (C.--, therefor In column 30, line 47, delete "C" and insert --$C_1$--, therefor

UNITED STATES PATENT AND TRADEMARK OFFICE
CERTIFICATE OF CORRECTION

PATENT NO. : 8,349,289 B2  
APPLICATION NO. : 12/043030  
DATED : January 8, 2013  
INVENTOR(S) : Lanny D. Schmidt et al.

Page 1 of 1

It is certified that error appears in the above-identified patent and that said Letters Patent is hereby corrected as shown below:

Title Page,
Item [75], Inventors, "David Rennard, Minneapolis, MN (US)" (as inserted in the Certificate of Correction issued July 2, 2013) is deleted and patent is returned to its original state with Title Page, Item (75) Inventors to read:

--Lanny D. Schmidt, Minneapolis, MN (US); Paul J. Dauenhauer, Wisconsin Rapids, WI (US); Bradon J. Dreyer, Rockford, MI (US); James R. Salge, Lancaster, NY (US)--

Signed and Sealed this
Sixteenth Day of September, 2014

Michelle K. Lee
*Deputy Director of the United States Patent and Trademark Office*